(12) United States Patent
Conway et al.

(10) Patent No.: US 9,420,897 B2
(45) Date of Patent: Aug. 23, 2016

(54) CLIP ASSEMBLY FOR USE HOLDING SINUOUS SPRINGS

(71) Applicant: L&P Property Management Company, South Gate, CA (US)

(72) Inventors: Lawrence J. Conway, Des Plaines, IL (US); Scott A. Bridges, Lake Villa, IL (US)

(73) Assignee: L&P Property Management Company, South Gate, CA (US)

( * ) Notice: Subject to any disclaimer, the term of this patent is extended or adjusted under 35 U.S.C. 154(b) by 22 days.

(21) Appl. No.: 14/628,579

(22) Filed: Feb. 23, 2015

(65) Prior Publication Data
US 2015/0164239 A1  Jun. 18, 2015

Related U.S. Application Data

(62) Division of application No. 13/648,611, filed on Oct. 10, 2012, now Pat. No. 8,991,016.

(51) Int. Cl.
| | |
|---|---|
| *B65D 71/06* | (2006.01) |
| *A47C 31/06* | (2006.01) |
| *A47C 23/057* | (2006.01) |
| *A47C 7/30* | (2006.01) |
| *F16B 2/22* | (2006.01) |
| *F16B 15/00* | (2006.01) |
| *F16B 15/06* | (2006.01) |
| *F16B 15/08* | (2006.01) |

(52) U.S. Cl.
CPC . *A47C 31/06* (2013.01); *A47C 7/30* (2013.01); *A47C 23/057* (2013.01); *F16B 2/22* (2013.01); *F16B 15/0015* (2013.01); *F16B 15/06* (2013.01); *F16B 15/08* (2013.01); *Y10T 24/3455* (2015.01); *Y10T 24/3459* (2015.01); *Y10T 24/44017* (2015.01)

(58) Field of Classification Search
CPC ........ A47C 31/06; A47C 23/057; A47C 7/30; F16B 2/22; F16B 15/00; F16B 15/06; F16B 15/08; Y10T 24/3455; Y10T 24/3459; Y10T 24/44017
See application file for complete search history.

(56) References Cited

U.S. PATENT DOCUMENTS

| | | | |
|---|---|---|---|
| 2,111,404 | A | 3/1938 | Pankonin |
| 2,526,902 | A | 10/1950 | Rublee |
| 2,574,811 | A | 11/1951 | Blumensaadt |
| 3,083,369 | A | 4/1963 | Peterson |
| 3,252,569 | A | 5/1966 | Matthews |
| 3,263,294 | A | 8/1966 | Pappas |
| 3,323,183 | A | 6/1967 | Sterner |
| 3,422,468 | A | 1/1969 | Schutz |

(Continued)

FOREIGN PATENT DOCUMENTS

| | | |
|---|---|---|
| DE | 2250375 | 7/1973 |
| WO | 97/43192 | 11/1997 |

*Primary Examiner* — Robert J Sandy
*Assistant Examiner* — Michael Lee
(74) *Attorney, Agent, or Firm* — Wood, Herron & Evans, LLP

(57) ABSTRACT

A piece of furniture includes a rectangular frame for supporting a plurality of sinuous springs. A plurality of clip assemblies are secured to opposed side walls of frame. Each clip assembly comprises a non-metallic piece having openings and a metallic piece having tacks extending through the openings for insertion into the frame. Flexible connectors may be located in grooves of the clip assembly to collate multiple clip assemblies.

24 Claims, 19 Drawing Sheets

(56) References Cited

U.S. PATENT DOCUMENTS

| | | |
|---|---|---|
| 3,553,794 A | 1/1971 | Kneidl et al. |
| 3,613,878 A | 10/1971 | Langas et al. |
| 3,711,931 A | 1/1973 | Ladouceur et al. |
| 3,722,670 A | 3/1973 | Plunkett |
| 3,845,860 A | 11/1974 | Ladouceur et al. |
| 3,874,263 A | 4/1975 | Barth et al. |
| 3,940,844 A | 3/1976 | Colby et al. |
| 3,992,853 A | 11/1976 | Morris |
| 4,129,059 A | 12/1978 | Van Eck |
| 4,153,959 A | 5/1979 | Omley |
| 4,508,220 A | 4/1985 | Pearson |
| 4,935,998 A | 6/1990 | Frazier et al. |
| 4,955,813 A | 9/1990 | Fochler |
| D330,851 S | 11/1992 | Roick |
| 5,303,821 A | 4/1994 | Ayres |
| 5,314,065 A | 5/1994 | Ayres et al. |
| 5,564,564 A | 10/1996 | Poffenberger |
| 5,682,994 A | 11/1997 | Poffenberger |
| 5,833,064 A | 11/1998 | Ayres et al. |
| 5,878,880 A | 3/1999 | Poffenberger |
| 5,927,491 A | 7/1999 | Room et al. |
| 6,055,716 A | 5/2000 | Ayres et al. |
| 6,126,126 A | 10/2000 | McKiernan, Jr. |
| 6,704,974 B2 | 3/2004 | Lackler |
| 7,882,948 B2 | 2/2011 | West |
| 2003/0025256 A1 | 2/2003 | Roick |
| 2014/0096346 A1 | 4/2014 | Conway et al. |

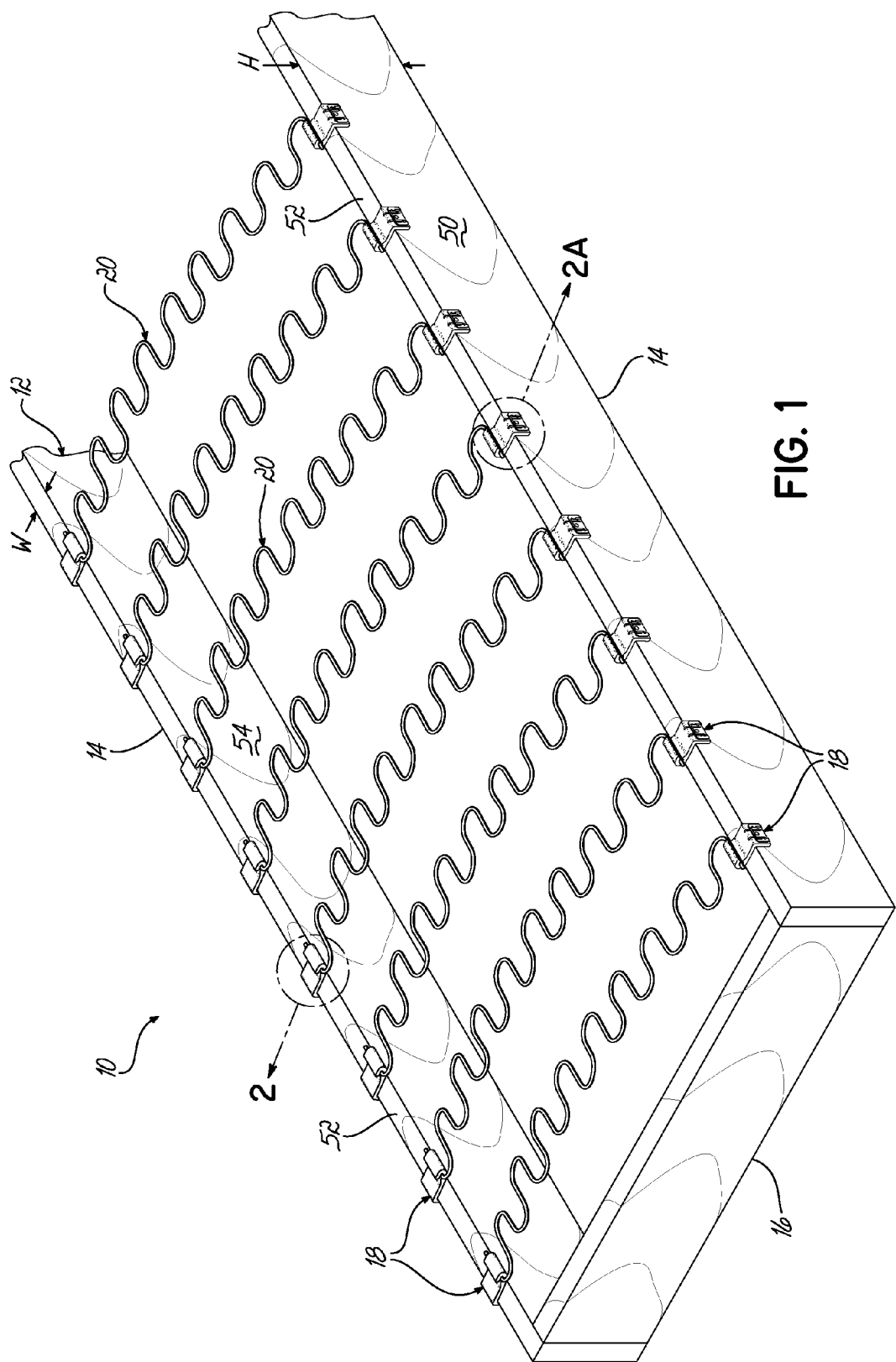

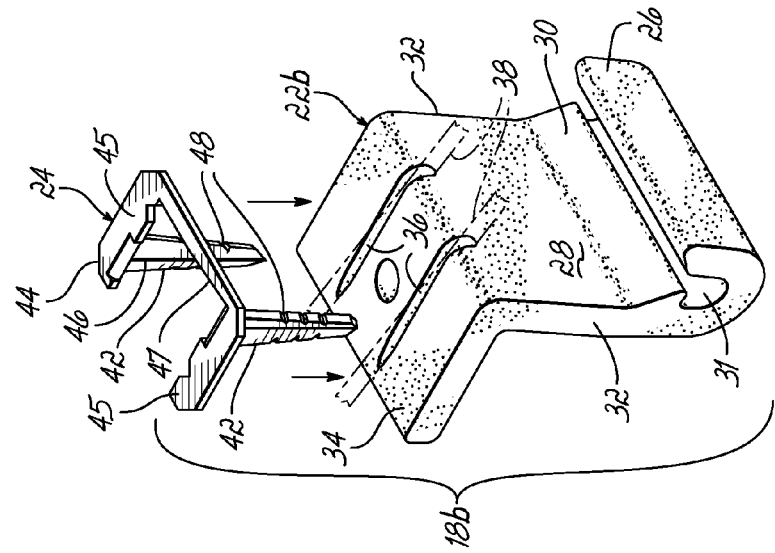
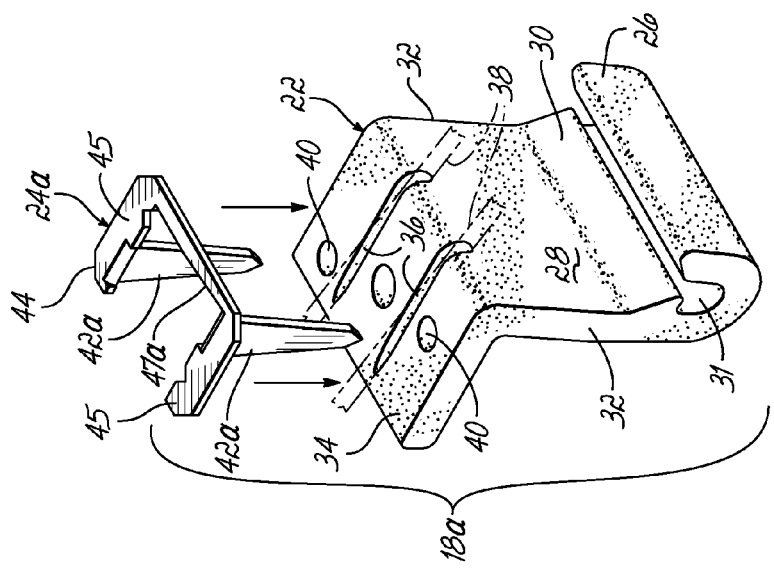
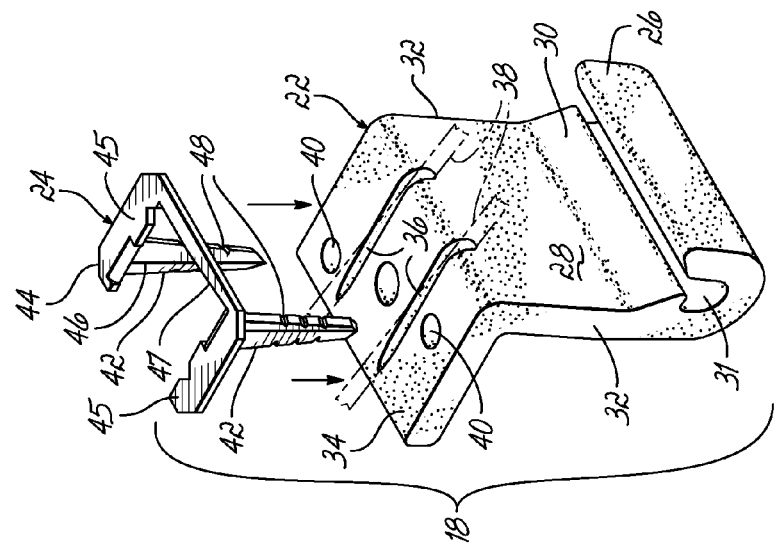
FIG. 6
FIG. 6A
FIG. 6B

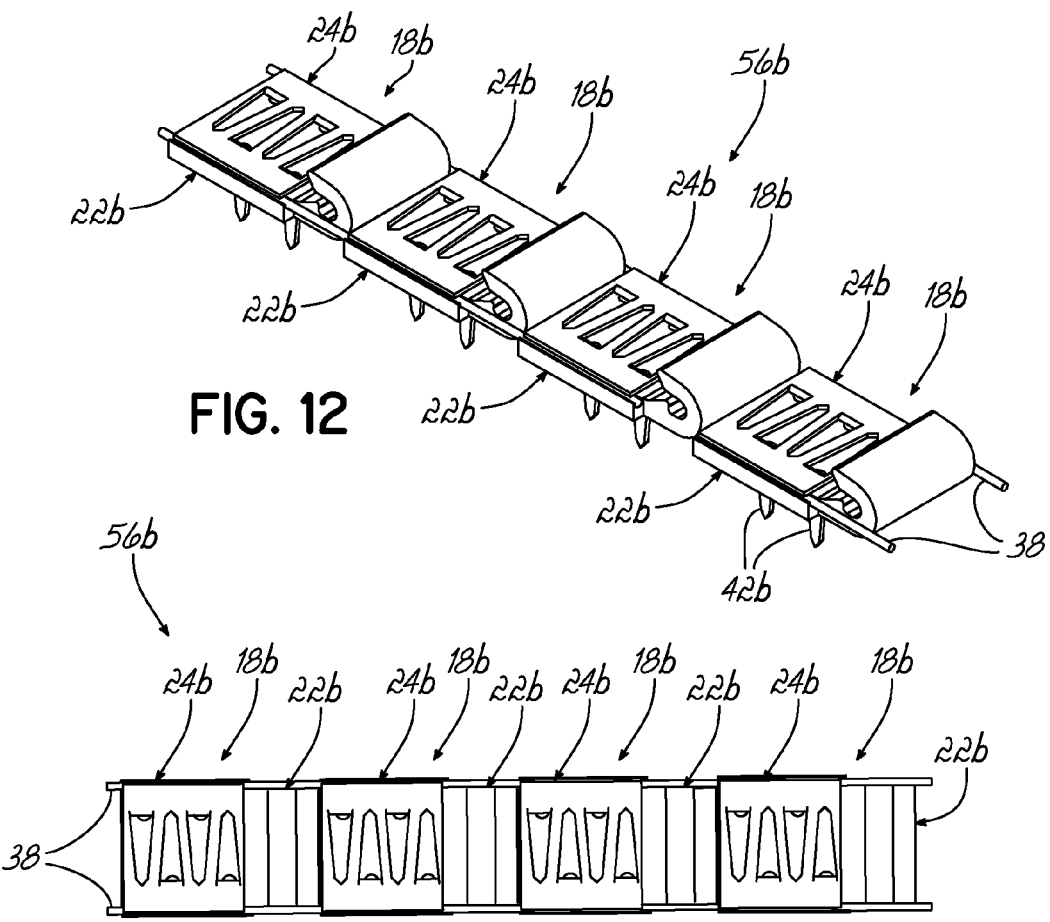
FIG. 12
FIG. 13
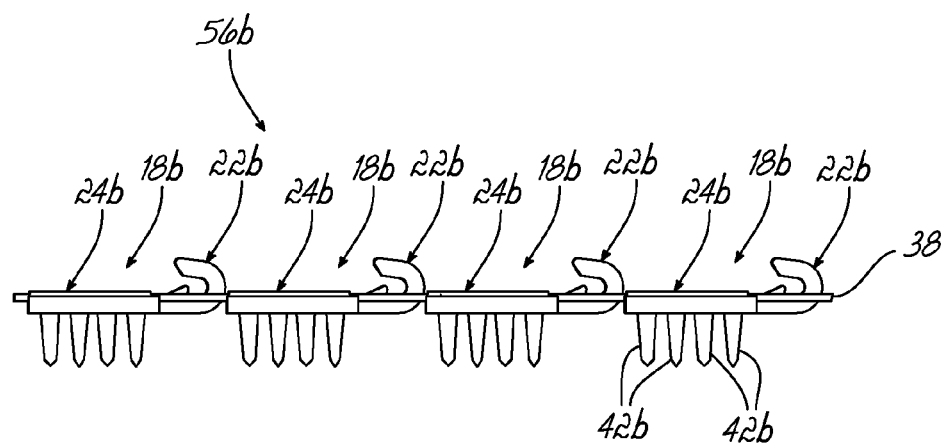
FIG. 14

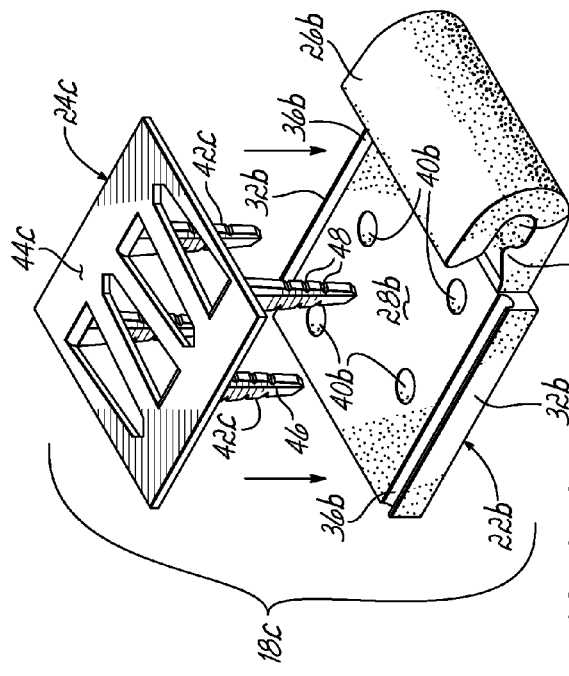
FIG. 15A
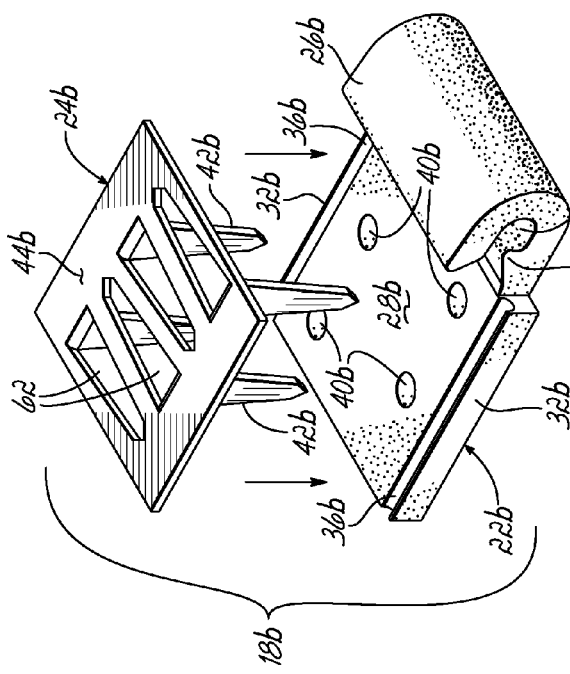
FIG. 15
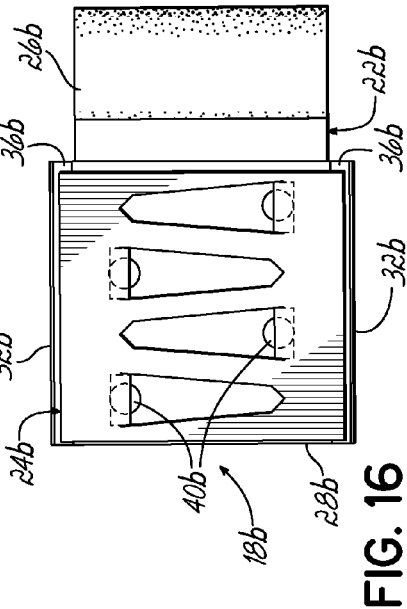
FIG. 17
FIG. 16

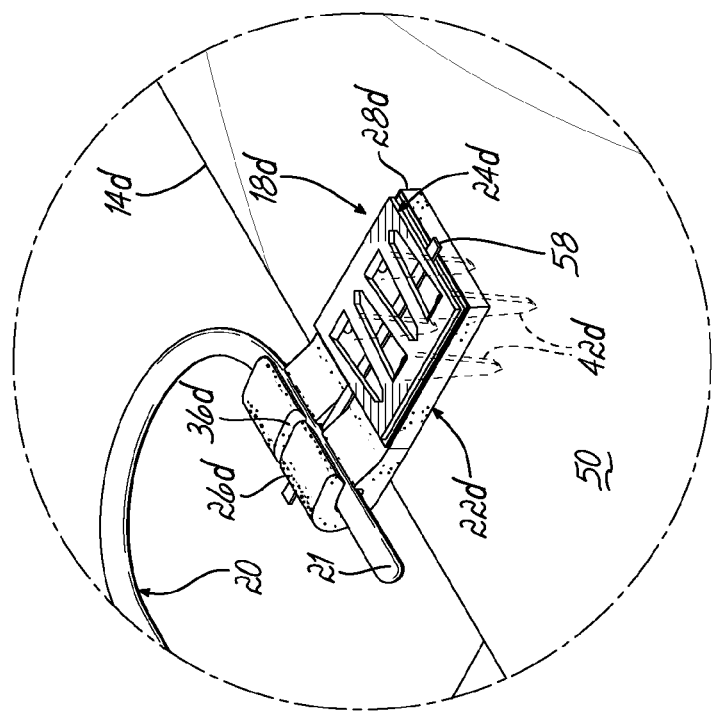
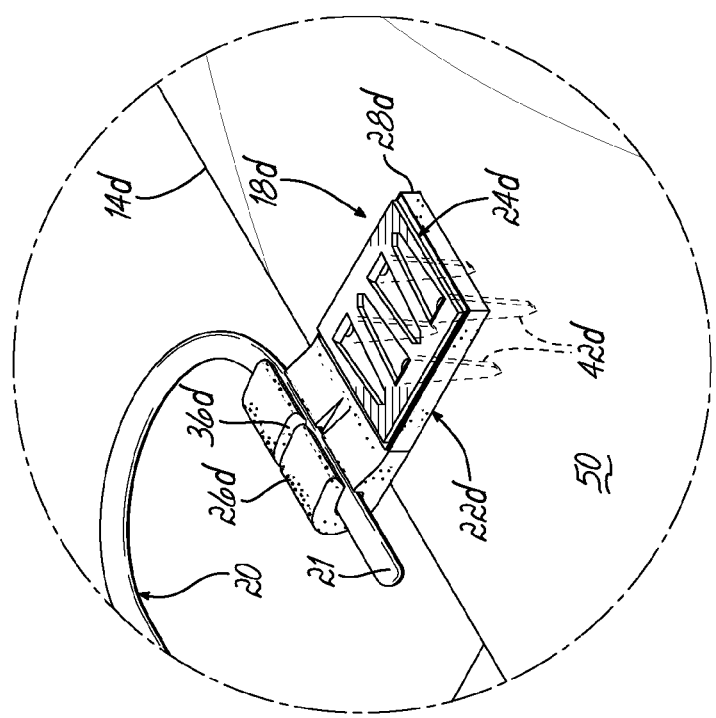

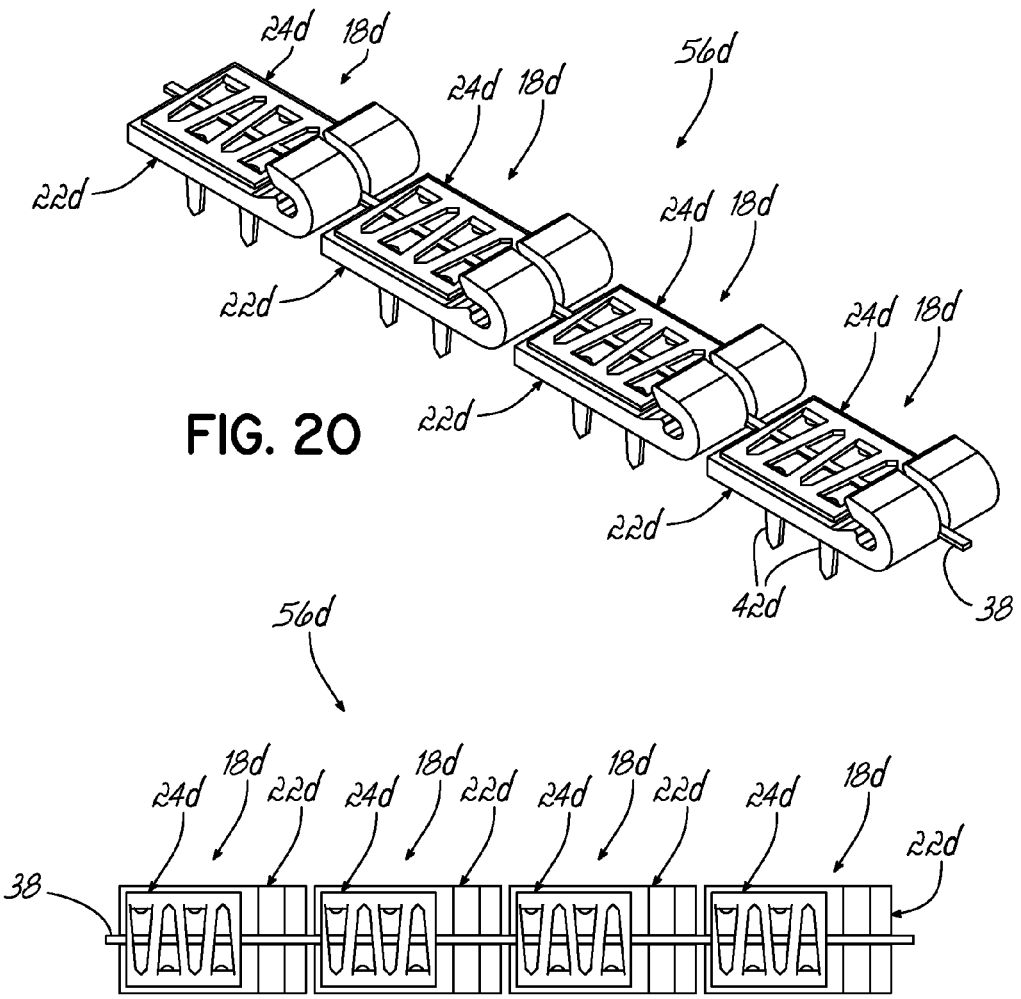
FIG. 20
FIG. 21
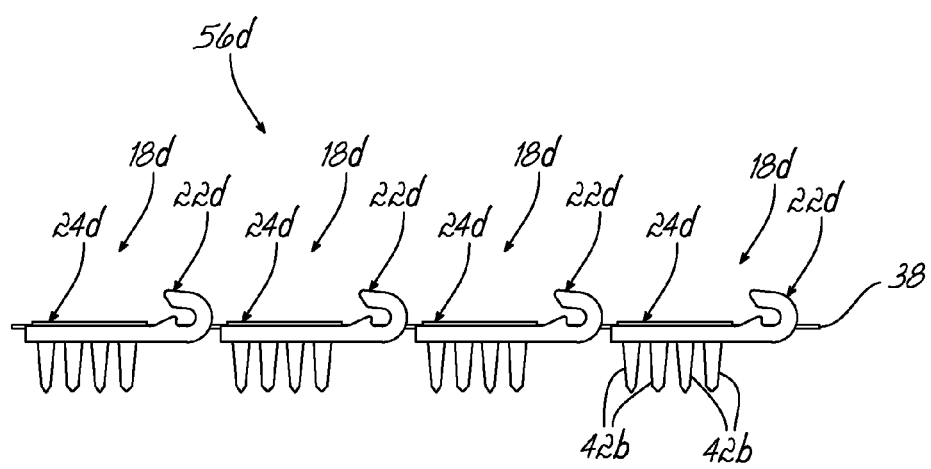
FIG. 22

CLIP ASSEMBLY FOR USE HOLDING SINUOUS SPRINGS

CROSS REFERENCE TO RELATED APPLICATIONS

This application is a divisional of U.S. patent application Ser. No. 13/648,611 filed Oct. 10, 2012, which is fully incorporated herein.

FIELD OF THE INVENTION

This invention relates generally to clip assemblies for use in the manufacture of furniture and, more particularly, for holding sinuous springs in position in furniture.

BACKGROUND OF THE INVENTION

In many industries, as, for example, in the mattress or bedding industry, it is common practice to secure two wires or rods, such as a spring element of a mattress, to a border wire with clips made from sheet metal. Such clips are generally in a U-shape having an arcuate crown portion and oppositely spaced leg portions depending from the crown portion. The two wires to be connected are placed between the leg portions of the clip and the leg portions pushed together by a clinching tool, thus securing or locking the two wires together.

Such a clinching tool typically includes a J-shaped jaw into which the leading clip of a stack of clips is indexed. The clinching tool has a blade which shears off the first clip from a stack of clips placed inside the clinching tool. U.S. Pat. No. 2,574,811 shows such a clinching tool.

In order to operate the clinching tool, it is necessary to place a plurality of clips inside the clinching tool in an orderly fashion. The clips must be similarly oriented and in an abutting relationship to one another, each clip abutting the two adjacent clips in an orderly fashion.

Clips must be interconnected to each other in a flexible manner so that the stack of clips can be wound into the clinching tool.

The clips must also be interconnected with sufficient strength so that they are able to withstand high tensile forces associated with winding and unwinding of the stack of clips upon a spool in the clinching machine. Accidental breakage of the connector connecting adjacent clips would be detrimental to the operation of the clinching machine.

One common way used to interconnect similar U-shaped sheet metal clips together is by means of non-metal, elongated flexible members made of plastic. Slots or grooves through the arcuate portion of each U-shaped clip are lined up, such that the non-metallic flexible members may be placed inside all of the grooves in order to connect the clips together in a flexible manner.

Several techniques have been developed to secure the non-metallic flexible connectors inside the slots of each clip. U.S. Pat. No. 5,303,821 discloses deforming the side edges of the arcuate crown portion of each clip inwardly so as to crimp the plastic connectors inside the grooves or slots on the arcuate top portions of the sheet metal U-shaped clips. U.S. Pat. Nos. 5,564,564; 5,682,994 and 5,878,880 each disclose a U-shaped clip having tabs extending upwardly from slots formed in the arcuate crown portion of the clip. After connectors are placed inside the slots of a plurality of aligned clips, a roller or rollers pass over the arcuate crown portions of the clips to push down the tabs of each clip, thereby securing the connectors inside the slots.

U.S. Pat. No. 5,878,880 discloses a clip made of sheet metal having a U-shaped hook portion inside which is secured a sheet of cushioning material, such as plastic. When a wire is placed inside the hook portion, the cushioning material prevents wire-on-wire noise, such as squeaking. U.S. Pat. No. 5,833,064 discloses another such clip having a plastic liner to prevent metal-on-metal squeaking or 'noise". Over time, these plastic liners may wear out or move/shift.

These two patents, U.S. Pat. Nos. 5,878,880 and 5,833,064, disclose U-shaped clips which may be connected to identical clips in a string and which have prongs or tacks inherently formed from the sheet metal, the prongs being bent downwardly and adapted to be inserted into wooden rails of furniture frames. These prongs or tacks have a smooth surface which may not hold the clip inside wooden rails of furniture frames as securely as desired.

Thus, there is a need for a U-shaped clip assembly which may be made partially of metal and partially of plastic which does not result in squeaking or "noise" over time.

There is further a need for a U-shaped clip assembly which may be constructed of less sheet metal than known clips, thereby reducing the cost of the clips.

There is further a need for a lower shroud for a U-shaped clip assembly which provides improved holding strength when inserted inside wooden rails of furniture frames.

SUMMARY OF THE INVENTION

This invention comprises a clip assembly for securing an end portion of a sinuous spring to a wooden rail. The clip assembly comprises two components: a plastic clip and a metal fastener, including at least two tacks extending downwardly from a portion of the fastener wherein each of the tacks passes through an opening in the plastic clip. The tacks may be driven through, molded into or passed through holes or openings in the plastic clip. The metal fastener is a unitary member, the tacks of the metal fastener being formed from the metal material of the fastener and extending outwardly from the remainder of the metal fastener. The tacks may be creased and/or serrated to ensure a sturdy, secure connection of the clip assembly to the wood of the furniture frame. In some embodiments, each metal fastener or second piece of each clip assembly may have two tacks. In other embodiments, each metal fastener or second piece of each clip assembly may have four tacks.

According to another aspect of this invention, the clip assembly comprises a non-metallic clip having a U-shaped hook portion adapted to receive and retain a portion of a spring and a metal fastener, including at least two tacks extending outwardly from a planar portion of the fastener wherein each of the tacks passes through the non-metallic clip. In any of the embodiments of this invention, the plastic clip may lack openings, in which case the tacks of the metal fastener would be driven through the material of the non-metallic clip.

According to another aspect of this invention, the clip assembly comprises a first non-metallic piece having openings therethrough and a second metal piece having projections extending through the openings of the first piece, the projections being adapted to be secured into a wooden rail.

BRIEF DESCRIPTION OF THE DRAWINGS

FIG. 1 is a perspective view of a furniture frame and sinuous springs extending from one side to the other side of the frame, clip assemblies in accordance with one embodiment being secured to the frame sides;

FIG. 6 is a partially disassembled view of a portion of the clip assembly of FIGS. 2B and 2C;

FIG. 6A is a partially disassembled view, similar to FIG. 6, of a portion of an alternative embodiment of clip assembly;

FIG. 6B is a partially disassembled view, similar to FIG. 6, of a portion of an alternative embodiment of clip assembly;

FIG. 12 is a perspective view of a portion of a collated string of clip assemblies of FIG. 10;

FIG. 13 is a top plan view of the portion of the collated string of clip assemblies of FIG. 12;

FIG. 14 is a side elevational view of the portion of the collated string of clip assemblies of FIG. 12;

FIG. 15 is a partially disassembled view of a portion of the clip assembly of FIG. 11;

FIG. 15A is a partially disassembled view, similar to FIG. 15, of a portion of an alternative embodiment of clip assembly;

FIG. 16 is a top plan view of the clip assembly of FIG. 15;

FIG. 17 is a side elevational view of the clip assembly of FIG. 15;

FIG. 19 is an enlarged view of the encircled area 19 of FIG. 18;

FIG. 19A is an enlarged view, similar to FIG. 19, of the clip assembly of FIG. 19 showing a piece of connector secured to the clip assembly;

FIG. 20 is a perspective view of a portion of a collated string of clip assemblies of FIG. 18;

FIG. 21 is a top plan view of the portion of the collated string of clip assemblies of FIG. 20;

FIG. 22 is a side elevational view of the portion of the collated string of clip assemblies of FIG. 20;

DETAILED DESCRIPTION OF THE DRAWINGS

Figure 2A:
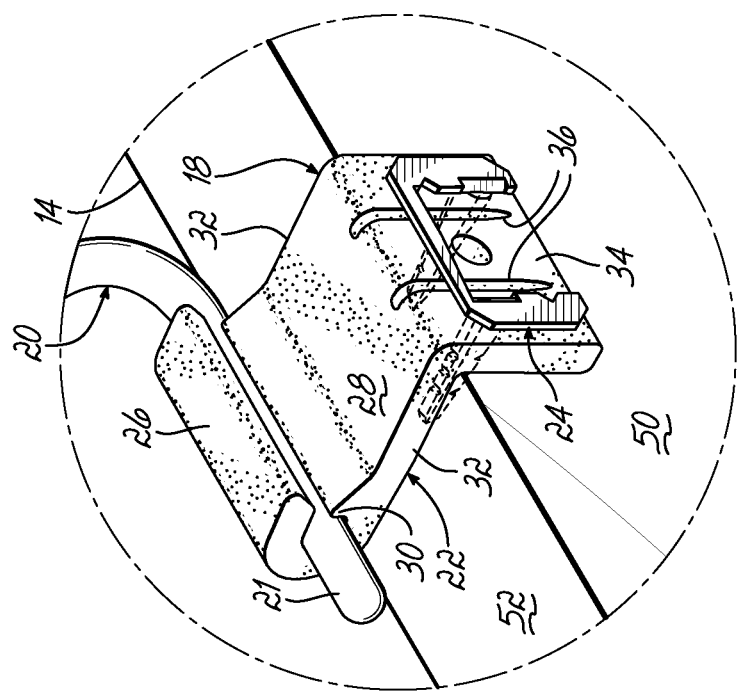
FIG. 2A is an enlarged view of the encircled area 2A of FIG. 1.

Referring to the drawings, and particularly to FIG. 1, there is illustrated a portion of a piece of furniture 10 comprising a rectangular frame 12 comprising two side walls 14 and two end walls 16 (only one being shown in FIG. 1). For purposes of this document, the word "furniture" is not intended to be limiting; it may include seats for vehicles or other frames. The frame 12 is most commonly made of wood, but may be made of other suitable materials. In the embodiment of frame 12 shown in FIG. 1, each of the side and end walls 14, 16, respectively, is placed on edge with the height "H" being greater than the width "W" of each wall.

As shown in FIG. 1, furniture piece 10 further comprises a plurality of clip assemblies 18 secured to the side walls 14 of the frame 12 in a spaced manner for securing and retaining a plurality of sinuous springs 20. Clip assemblies 18, secured to opposed side walls 14, are aligned to receive and retain end portions 21 of sinuous springs 20 in desired positions and under desired amounts of tension, as shown in FIG. 1. Commonly, such sinuous springs 20 are arched or bowed upwardly to provide resiliency to the furniture piece 10.

Figure 2:
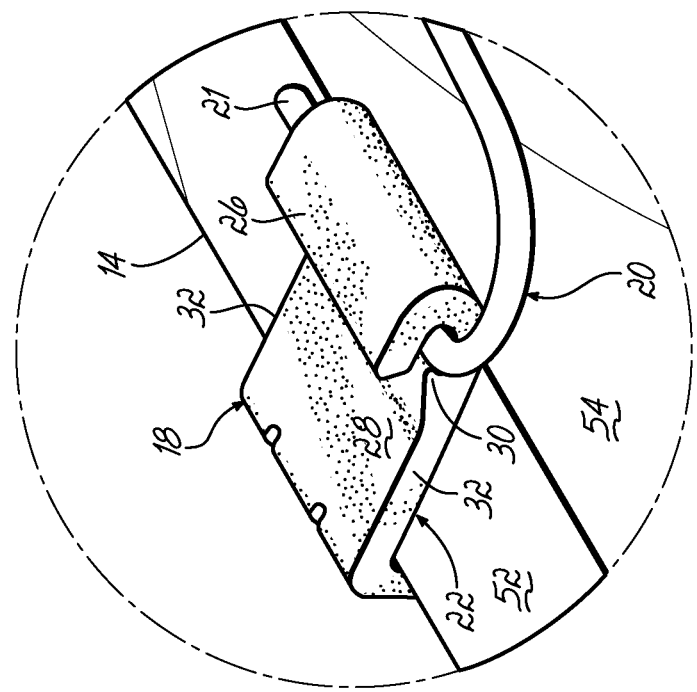
FIG. 2 is an enlarged view of the encircled area 2 of FIG. 1.

FIGS. 2 and 2A each show one of the clip assemblies 18 secured to one of the side walls 14 of frame 12. As best shown in FIG. 6, each clip assembly 18 comprises a first non-metallic piece or clip 22, usually made of plastic, and a second metal piece or fastener 24, respectively. The pieces 22, 24 are joined together and secured to one of the side walls 14 of the generally rectangular furniture frame 12.

Figure 3:
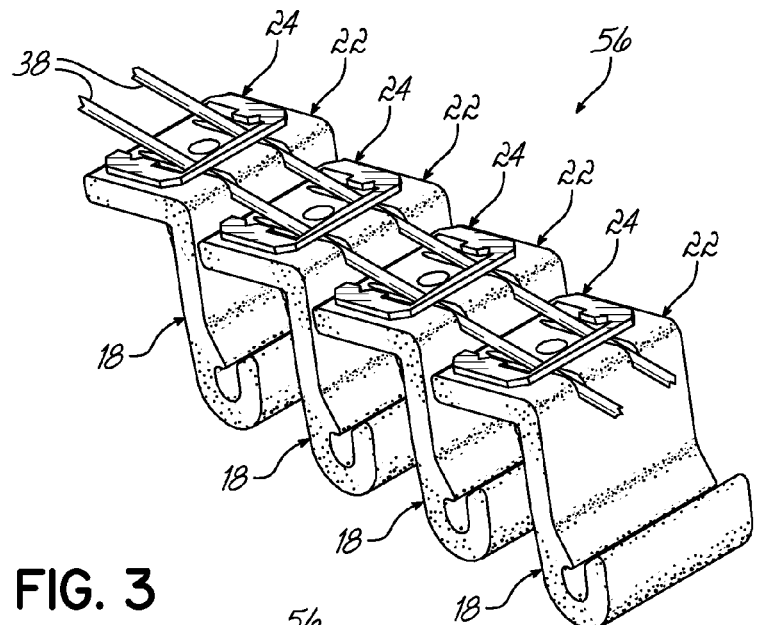
FIG. 3 is a perspective view of a portion of a collated string of clip assemblies of FIG. 1.
Figure 4:
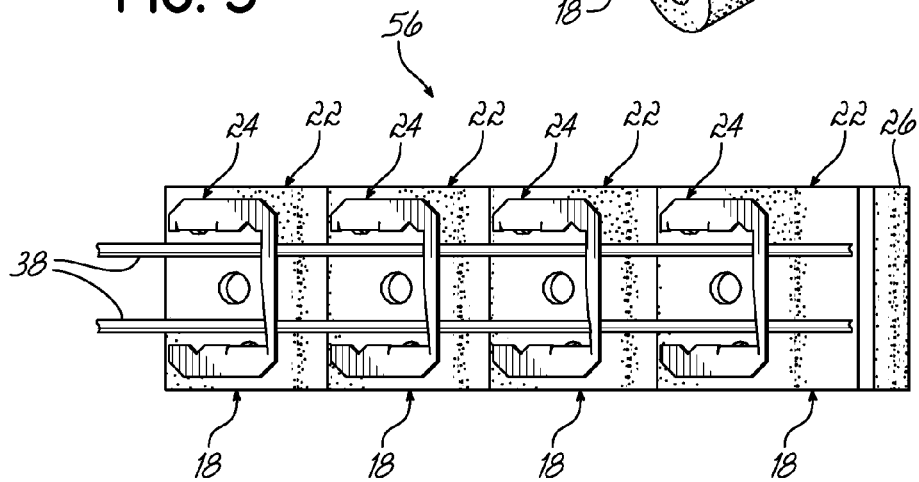
FIG. 4 is a top plan view of the portion of the collated string of clip assemblies of FIG. 3.
Figure 5:
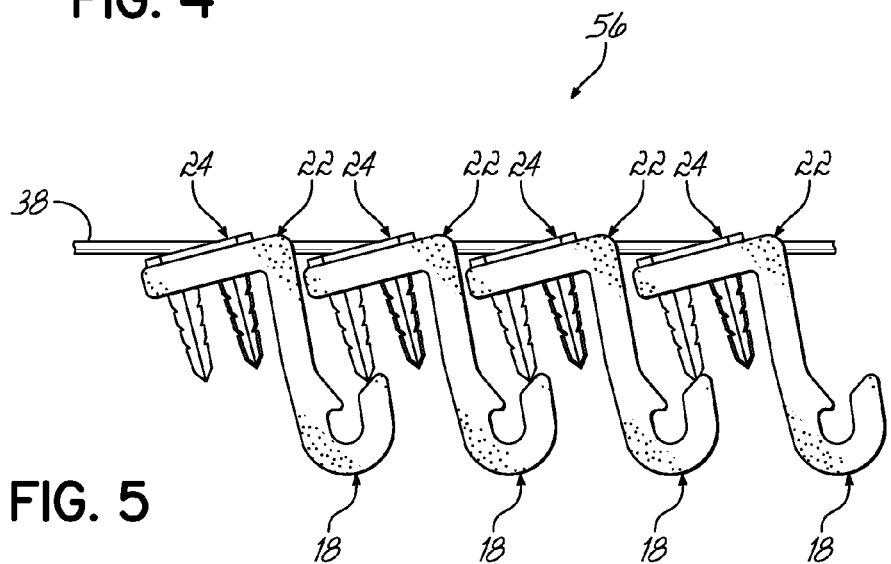
FIG. 5 is a side elevational view of the portion of the collated string of clip assemblies of FIG. 3.

The first piece 22 of clip assembly 18 comprises a U-shaped hook portion 26 adapted to receive and retain an end portion 21 of one of the sinuous springs 20. The first piece 18 further comprises a generally planar body portion 28 which includes a ledge 30 extending from one side edge 32 to the opposed side edge 32 of the body portion 28 of the first piece 22 of the clip assembly 18. When the end portion 21 of one of the sinuous springs 20 is inserted into the U-shaped hook portion 26, the ledge 30 of the body portion 28 holds or retains the end portion 21 of the sinuous spring 20 in a receptacle 31, illustrated in FIG. 8. The first piece 22 of clip assembly 18 further comprises a generally planar flange portion 34 extending outwardly from the end of the body portion 28 opposite the U-shaped hook portion 26 in a direction generally orthogonal or perpendicular to the body portion 28. As best shown in FIG. 2A, the flange portion 34 of the first piece 22 of clip assembly 18 has a pair of spaced grooves 36 adapted to receive non-metallic connectors 38 which connect multiple clip assemblies 18 together, as shown in FIGS. 3-5. In some embodiments, the grooves 36 may be omitted. For example, clip assemblies shown in FIG. 6 may lack grooves 36.

As shown in FIG. 6, the flange portion 34 of the first piece 22 of clip assembly 18 has a pair of spaced openings 40, each opening 40 extending through the thickness of the flange portion 34 of the first piece 22 of clip assembly 18. Although the openings 40 are shown as being round holes, they may be any other shapes, such as rectangular, for example.

Figure 8:
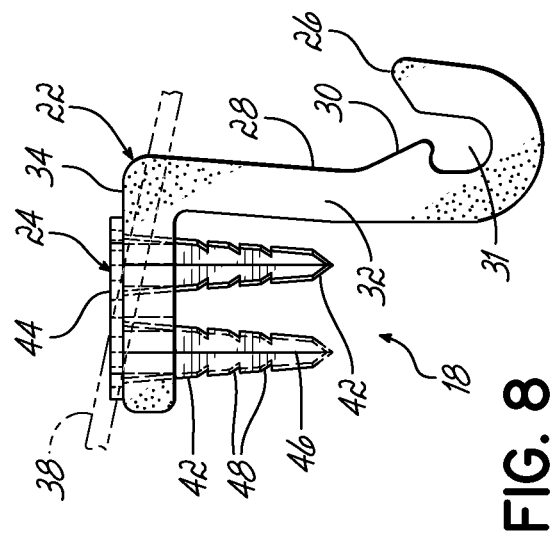
FIG. 8 is a side elevational view of the clip assembly of FIG. 6.
Figure 7:
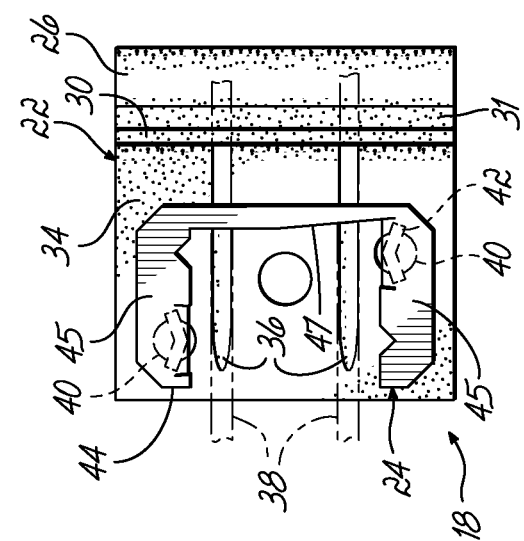
FIG. 7 is a top plan view of the clip assembly of FIG. 6.

As best shown in FIG. 6, the second piece 24 of clip assembly 18 has a pair of tacks 42 extending downwardly from a generally planar, generally U-shaped body portion 44 of the second piece 24 of clip assembly 18. More particularly, each of the tacks 42 extends downwardly from one of the sides 45 of the generally U-shaped body portion 44 of the second piece 24 of clip assembly 18. The sides 45 of the generally U-shaped body portion 44 of the second piece 24 of clip assembly 18 are connected by a connecting portion 47. The tacks 42 of the second piece 24 of clip assembly 18 are located and sized to pass through the openings 40 of the first piece 22 of clip assembly 18. Each of the tacks 42 of the second piece 24 of clip assembly 18 has a crease 46 therein so the tack 42 has a non-planar cross-section. More particularly, the cross-section of each tack 42 has a generally "V-shape", as shown in FIG. 5. As best shown in FIG. 8, each of the tacks 42 of the second piece 24 of clip assembly 18 also has a plurality of vertically spaced serrations or indentations 48 to improve the holding strength of the clip assembly 18 to the wooden furniture frame 12.

FIG. 6A illustrates an alternative clip assembly 18a having a first piece 22 identical to the one shown in FIG. 6 and a second piece 24a in which the tacks 24a are generally planar, lacking the crease and serrations 48 of each of the tacks 24 of the second piece 24 of clip assembly 18 shown in FIG. 6. As shown in FIG. 6A, each of the tacks 42a of second piece 24a of clip assembly 18a lacks the crease 46 and serrations 48 of each of the tacks 24 of the second piece 24 of clip assembly 18 shown in FIG. 6.

FIG. 6B illustrates an alternative clip assembly 18b having a first piece 22b slightly different than the first piece 22 shown in FIG. 6 and a second piece 24 identical to the second piece 24 of clip assembly 18 shown in FIG. 6. As shown in FIG. 6B, first piece 22b of clip assembly 18b lacks the openings 40 of the first piece 22 of clip assembly 18 shown in FIG. 6. In clip assembly 18b, the tacks 42 of the second piece 24 of clip assembly 18b may be driven through the material of the first piece 22b of clip assembly 18b. Alternatively, tacks like tacks 42a of the second piece 24a of clip assembly 18a may be used with a second piece of a clip assembly having no openings, in which case, the tacks would be driven through the material of the first piece of the clip assembly. In any of the embodiments described or illustrated herein, the plastic or non-metallic piece of the clip assembly may lack openings and the tacks of the metallic piece driven through the material of the plastic or non-metallic piece in order to secure the pieces of the clip assembly together.

As best illustrated in FIGS. 1, 2 and 2A, the tacks 42 of the second piece 24 of clip assembly 18 are secured inside one of the side walls 14 of furniture frame 12 with either an automated/mechanical machine or hand-held tool. When secured in place, the flange portion 34 of the first piece 22 of clip assembly 18 contacts or abuts an outer side surface 50 of one of the side walls 14 of furniture frame 12, and the body portion 28 of the first piece 22 of clip assembly 18 contacts or abuts an upper end surface 52 of one of the side walls 14 of furniture frame 12. As best shown in FIG. 2, the U-shaped hook portion 26 of the first piece 22 of clip assembly 18 is located generally above the inside side surface 54 of one of the side walls 14 of furniture frame 12.

FIG. 3 shows four clip assemblies 18 aligned in a similar orientation and having the flange portion 34 of the first piece 22 of clip assembly 18 contacting or proximate the body portion 28 of the first piece 22 of an adjacent clip assembly 18. When the clip assemblies are juxtaposed in such a manner, the grooves 36 of each clip assembly 18 are co-linearly aligned to permit a flexible connector 38 to be inserted into each of the aligned grooves 36 and extend the length of the aligned clip assemblies 18. As best shown in FIGS. 3-5, the two flexible connectors 38 are trapped or sandwiched between the first and second pieces 22, 24 of each clip assembly 18, each flexible connector being inside a plurality of aligned grooves 36 of multiple clip assemblies 18.

Although FIGS. 3-5 show four clip assemblies 18 aligned in a string 56 of aligned collated clip assemblies 18, the string 56 of aligned collated clip assemblies 18 may be made of any number of clip assemblies 18 connected together. In each of the aligned collated clip assemblies 18, the connectors 38 are trapped between the first and second pieces 22, 24 of the collated clip assembly 18.

The connectors 38 used to interconnect adjacent aligned clip assemblies 38 into a string 56 are preferably fabricated from a plastic material, such as a low density polyethylene or polyester plastic. The connectors 38 provide a flexibility in the collated string 56 of clip assemblies 18, which is needed when the string 56 is bent and rolled into a spool for insertion into a clinching tool. The connectors 38 have the required tensile strength to withstand pulling and twisting forces without breaking. Also, when a last clip assembly is cut off from the string 56, there are no sharp or jagged barbs left over to injure workers or tear fabric covering the clipped wires.

Figure 2C:
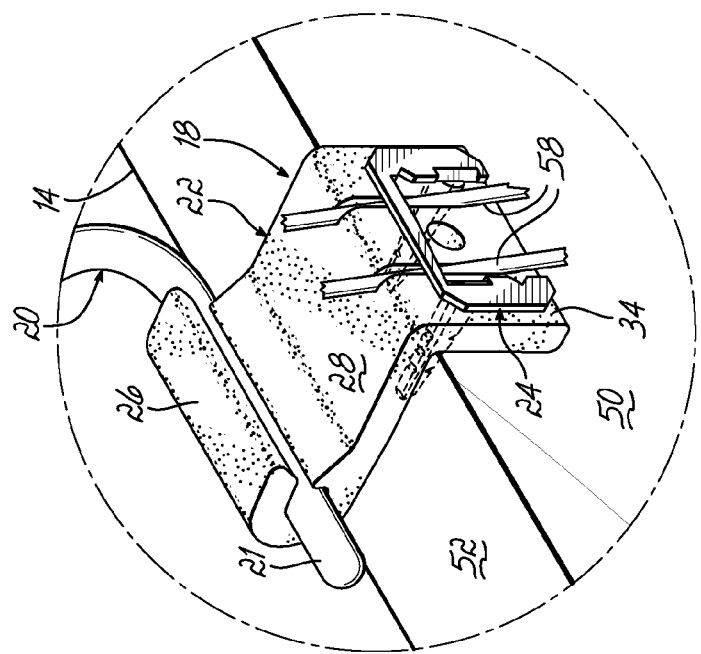
FIG. 2C is an enlarged view like the encircled area 2A showing pieces of connector secured to the clip assembly.
Figure 2B:
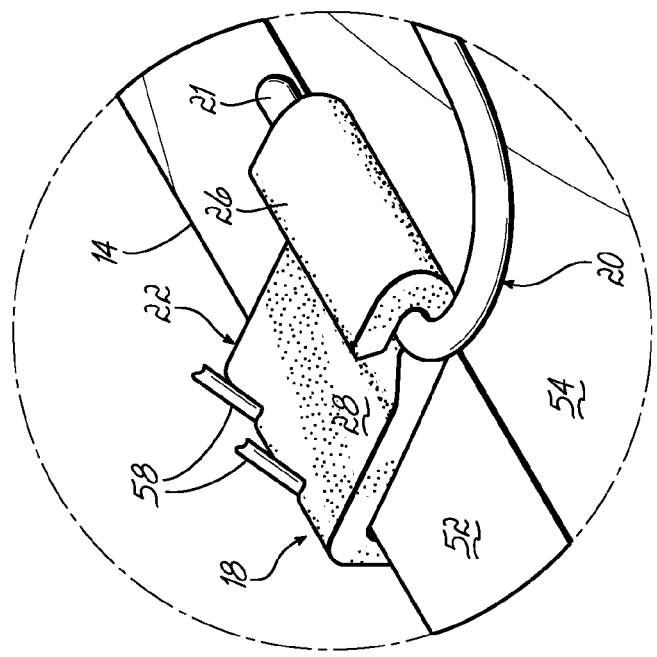
FIG. 2B is an enlarged view like the encircled area 2 showing pieces of connector secured to the clip assembly.

When used in a clipping tool, the connectors 38 may be broken between adjacent clip assemblies 18 in the collated string 56 of clip assemblies 18, leaving portions 58 of the connectors 38 with the clip assembly 18 secured to the frame 12. FIGS. 2B and 2C illustrate two such clip assemblies 18, each clip assembly 18 having portions 58 of the connectors 38 still with the clip assembly 18 when the clip assembly 18 is secured to one of the side walls 14 of frame 12.

Figure 9:
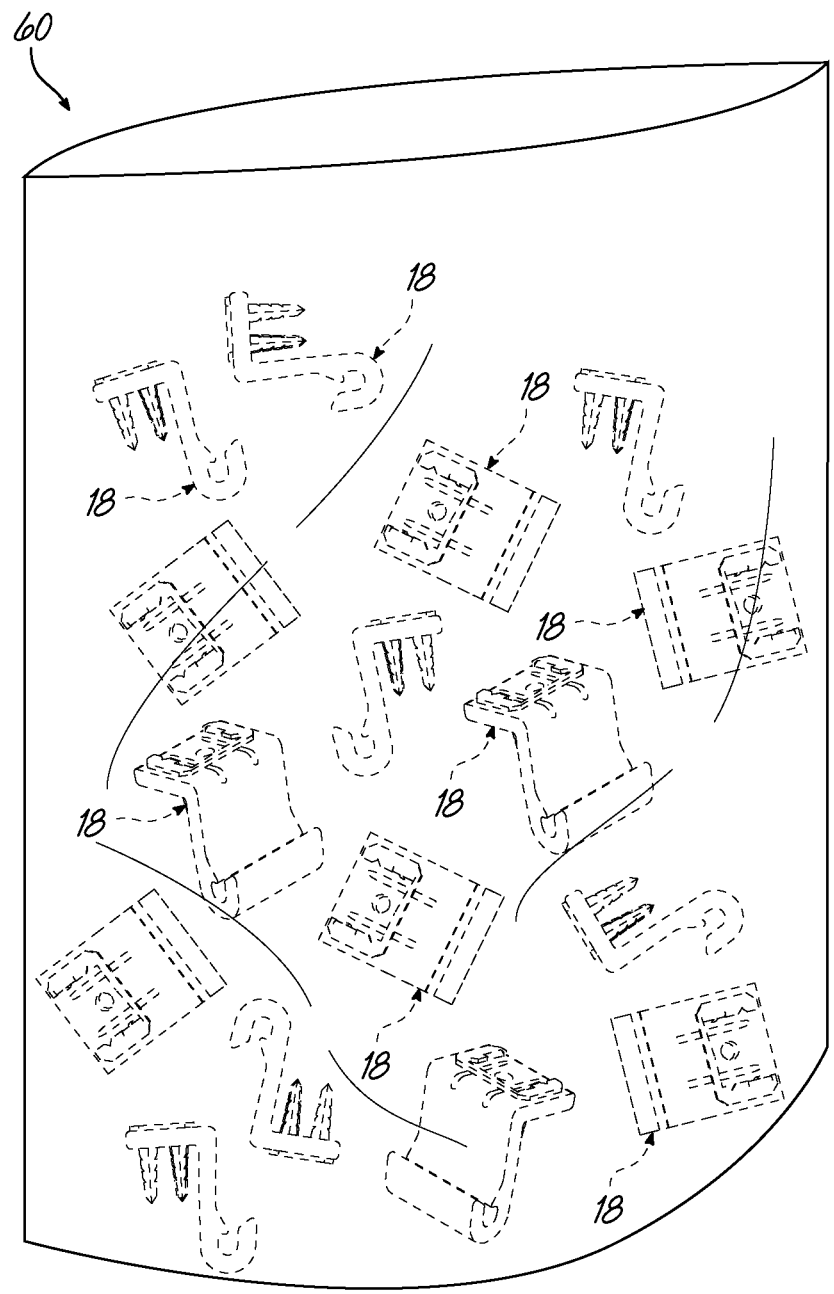
FIG. 9 is a perspective view of a bag or collection of clip assemblies.

FIG. 9 illustrates a package 60 of clip assemblies 18, which may be used to secure sinuous springs 20 to a frame 12, as described herein. However, in this embodiment of clip assembly 18, the second metallic piece 24 may or may not have any grooves. If the clip assemblies 18 lack the grooves, a plurality of such clip assemblies 18 may not be connected with flexible connectors 38, like clip assemblies 18. Therefore, the clip assemblies 18 may not be connected to each other and may be sold in a package 60 of individual clip assemblies.

Figure 10:
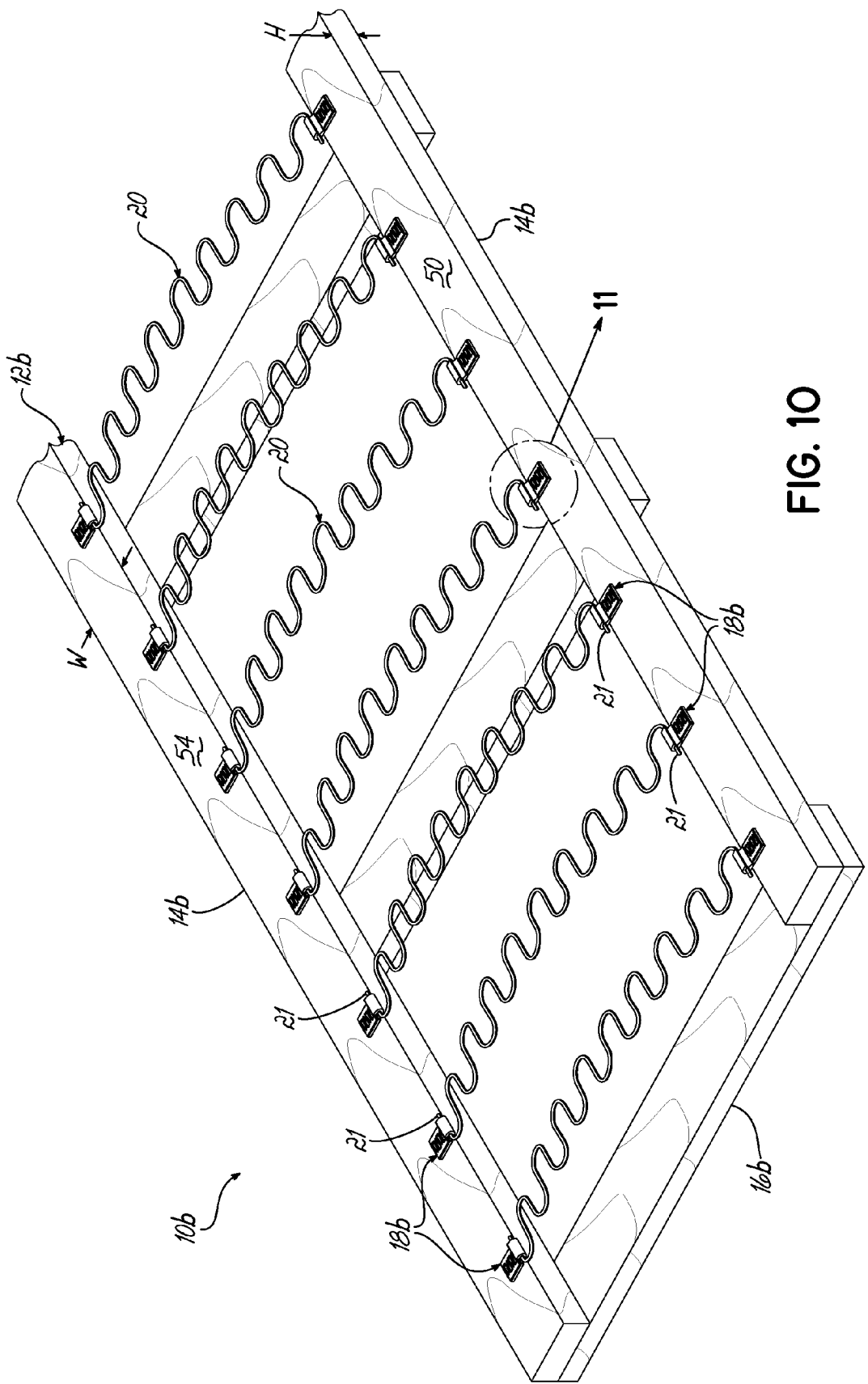
FIG. 10 is a perspective view of a frame and sinuous springs extending from one side to the other side of the frame, clip assemblies in accordance with another embodiment being secured to the frame sides, similar to FIG. 1.

FIG. 10 illustrates a portion of a piece of furniture 10b comprising a rectangular frame 12b comprising two side walls 14b and two end walls 16b (only one being shown in FIG. 10). The frame 12b is most commonly made of wood, but may be made of other suitable materials. In the embodiment of frame 12b shown in FIG. 10, each of the side and end walls 14b, 16b, respectively, is oriented such that the width "W" of each wall 14b, 16b is greater than its height "H".

As shown in FIG. 10, furniture piece 10b further comprises a plurality of clip assemblies 18b secured to the side walls 14b of the frame 12b in a spaced manner for securing and retaining a plurality of sinuous springs 20. Clip assemblies 18b, secured to opposed side walls 14b, are aligned to receive and retain end portions 21 of sinuous springs 20 in desired positions and under desired amounts of tension, as shown in FIG. 10. Commonly, such sinuous springs 20 are arched or bowed upwardly to provide resiliency to the furniture piece 10.

Figure 11A:
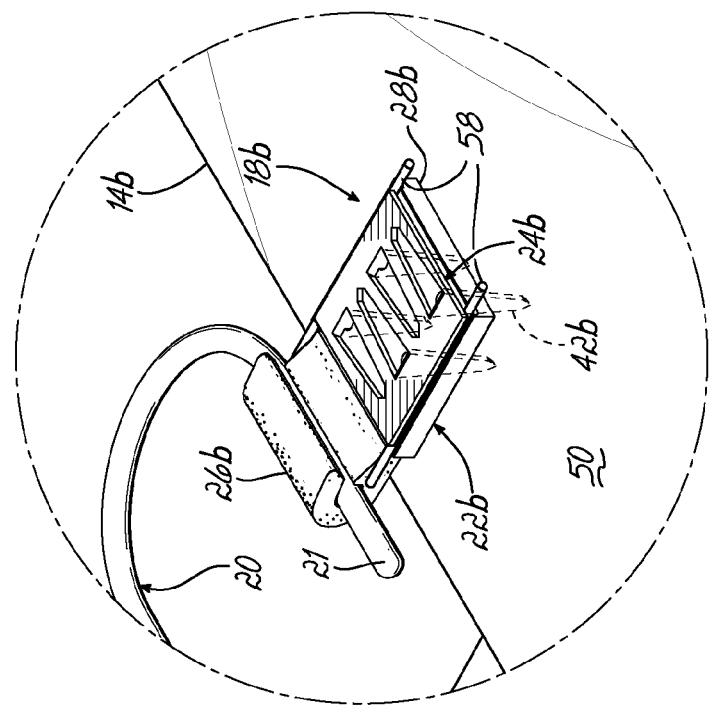
FIG. 11A is an enlarged view, similar to FIG. 11, of the clip assembly of FIG. 11 showing a piece of connector secured to the clip assembly.
Figure 11:
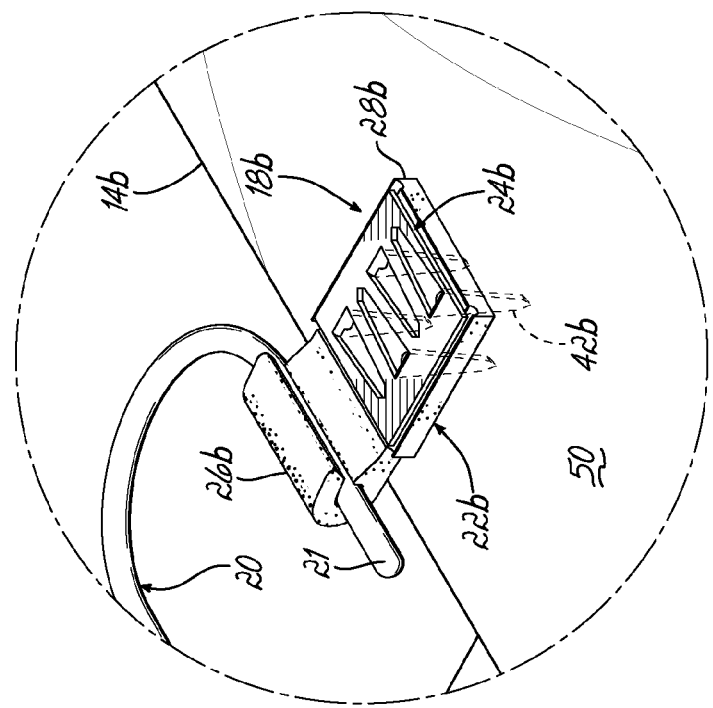
FIG. 11 is an enlarged view of the encircled area 11 of FIG. 10.

FIGS. 11 and 11A each show one of the clip assemblies 18b secured to one of the side walls 14b of frame 12b. As best shown in FIG. 15, each clip assembly 18b comprises a first non-metallic piece 22b, usually made of plastic, and a second metal piece 24b, respectively. The pieces 22b, 24b are joined together and secured to one of the side walls 14b of the generally rectangular furniture frame 12b.

As best shown in FIG. 15, the first piece 22b of clip assembly 18b comprises a U-shaped hook portion 26b adapted to receive and retain an end portion 21 of one of the sinuous springs 20. The first piece 22b of clip assembly 18b further comprises a generally planar body portion 28b, which includes a ledge 30b extending from one side edge 32b to the opposed side edge 32b of the body portion 28b of the first piece 22b of the clip assembly 18b. When the end portion 21 of one of the sinuous springs 20 is inserted into the U-shaped hook portion 26b, the ledge 30b of the body portion 28b holds or retains the end portion 21 of the sinuous spring 20 in a receptacle 31b, illustrated in FIG. 17. As best shown in FIG. 15A, the body portion 28b of the first piece 22b of clip assembly 18b has a pair of spaced grooves 36b along the outer periphery of the body portion 16b, each of the grooves 36b being adapted to receive a non-metallic connector 38. Two connectors 38 connect multiple clip assemblies 18b together, as shown in FIGS. 12-14.

As shown in FIG. 15, the body portion 28b of the first piece 22b of clip assembly 18b has four openings 40b, each opening 40b extending through the thickness of the body portion 28b of the first piece 22b of clip assembly 18b. As best shown in FIG. 15, the second piece 24b of clip assembly 18b has four tacks 42b extending downwardly from a generally planar, generally body portion 44b of the second piece 24b of clip assembly 18b. More particularly, each of the tacks 42b is formed from material from the body portion 44b of the second piece 24b of clip assembly 18b using a punch press. The tacks 24b initially lie in the plane of the body portion 44b and are bent downwardly out of the plane, thereby leaving four openings 62 in the body portion 44b of the second piece 24b of clip assembly 18b. The tacks 42b of the second piece 24b of clip assembly 18b are located and sized to pass through the openings 40b of the first piece 22b of clip assembly 18b. Each of the tacks 42b of the second piece 24b of clip assembly 12 is generally planar, lacking the crease and serrations of the tacks 42c of the second piece 24c of clip assembly 18c, shown in FIG. 15A.

FIG. 15A illustrates an alternative clip assembly 18c having a first piece 22b identical to the one shown in FIG. 15 and a second piece 24c in which the tacks 42c has a crease 46 therein so the tack 42c has a non-planar cross-section. More particularly, the cross-section of each tack 42c has a generally "V-shape", as shown in FIG. 15A. As best shown in FIG. 15A, each of the tacks 42c of the second piece 24c of clip assembly 18c also has a plurality of serrations or indentations 48 to improve the holding strength of the clip assembly 18c to the wooden furniture frame.

As best illustrated in FIGS. 10, 11 and 11A, the tacks 42b of the second piece 24b of clip assembly 18b are secured inside one of the side walls 14b of furniture frame 12b with a clipping tool (not shown). When secured in place, the body portion 28b of the first piece 22b of clip assembly 18b contacts or abuts an upper side surface 50 of one of the side walls 14b of furniture frame 12b. As best shown in FIGS. 11 and 11b, the U-shaped hook portion 26b of the first piece 22b of clip assembly 18b is located generally towards the interior of the rectangular frame 12b.

FIG. 12 shows four clip assemblies 18b aligned in a similar orientation and having the body portion 28b of the first piece 22b of a clip assembly 18b contacting or proximate the U-shaped hook portion 26b of the first piece 22b of an adjacent clip assembly 18b. When the clip assemblies 18b are juxtaposed in such a manner, the grooves 36b of each clip assembly 18b are co-linearly aligned to permit a flexible connector 38 to be inserted into each of the aligned grooves 36b and extend the length of the aligned clip assemblies 18b. As best shown in FIGS. 12-14, the two flexible connectors 38 are trapped or sandwiched between the first and second pieces 22b, 24b of each clip assembly 18b, each flexible connector 38 being inside a plurality of aligned grooves 36b of multiple clip assemblies 18b.

Although FIGS. 12-14 show four clip assemblies 18b aligned in a string 56b of aligned collated clip assemblies 18b, the string 56b of aligned collated clip assemblies 18b may be made of any number of clip assemblies 18b connected together.

The connectors 38 used to interconnect adjacent aligned clip assemblies 18b into a string 56b are preferably fabricated from a plastic material, such as a low density polyethylene or polyester plastic. The connectors 38 provide a flexibility in the collated string 56b of clip assemblies 18b, which is needed when the string 56b is bent and rolled into a spool for insertion into a clipping tool. The connectors 38 have the required tensile strength to withstand pulling and twisting forces without breaking. Also, when a last clip assembly is cut off from the string 56b, there are no sharp or jagged barbs left over to injure workers or tear fabric covering the clipped wires.

When used in a clipping tool, the connectors 38 may be broken between adjacent clip assemblies 18b in the collated string 56b of clip assemblies 18b, leaving portions 58 of the connectors 38 with the clip assembly 18b secured to the frame 12b. FIG. 11A illustrates one such clip assembly 18b, each clip assembly 18b having portions 58 of the connectors 38 still with the clip assembly 18b when the clip assembly 18b is secured to one of the side walls 14b of frame 12b.

Figure 18:
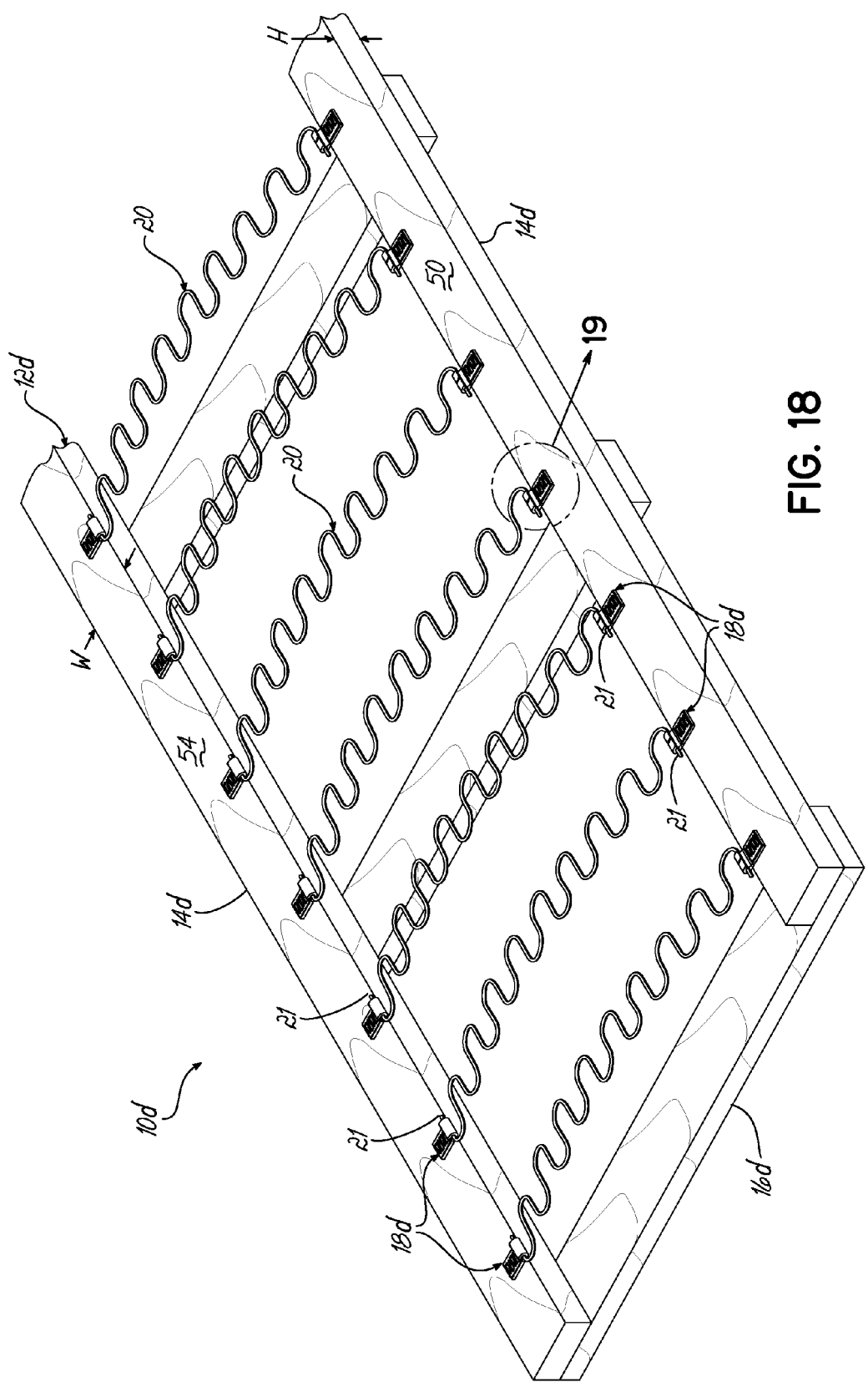
FIG. 18 is a perspective view of a furniture frame and sinuous springs extending from one side to the other side of the frame, clip assemblies in accordance with another embodiment being secured to the frame sides, similar to FIG. 10.
Figure 24:
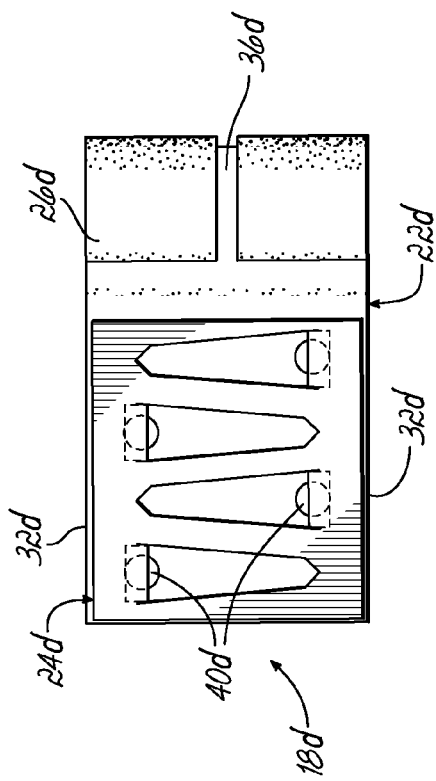
FIG. 24 is a top plan view of the clip assembly of FIG. 23.

FIG. 18 illustrates a portion of a piece of furniture 10d comprising a rectangular frame 12d comprising two side walls 14d and two end walls 16d (only one being shown in FIG. 18). The frame 12d is most commonly made of wood, but may be made of other suitable materials. In the embodiment of frame 12d shown in FIG. 18, each of the side and end walls 14d, 16d, respectively, is oriented such that the width "W" of each wall 14d, 16d is greater than its height "H".

As shown in FIG. 18, furniture piece 10d further comprises a plurality of clip assemblies 18d secured to the side walls 14d of the frame 12d in a spaced manner for securing and retaining a plurality of sinuous springs 20. Clip assemblies 18d, secured to opposed side walls 14d, are aligned to receive and retain end portions 21 of sinuous springs 20 in desired positions and under a desired amount of tension, as shown in FIG. 18. Commonly, such sinuous springs 20 are arched or bowed upwardly to provide resiliency to the furniture piece 10d.

Figure 23:
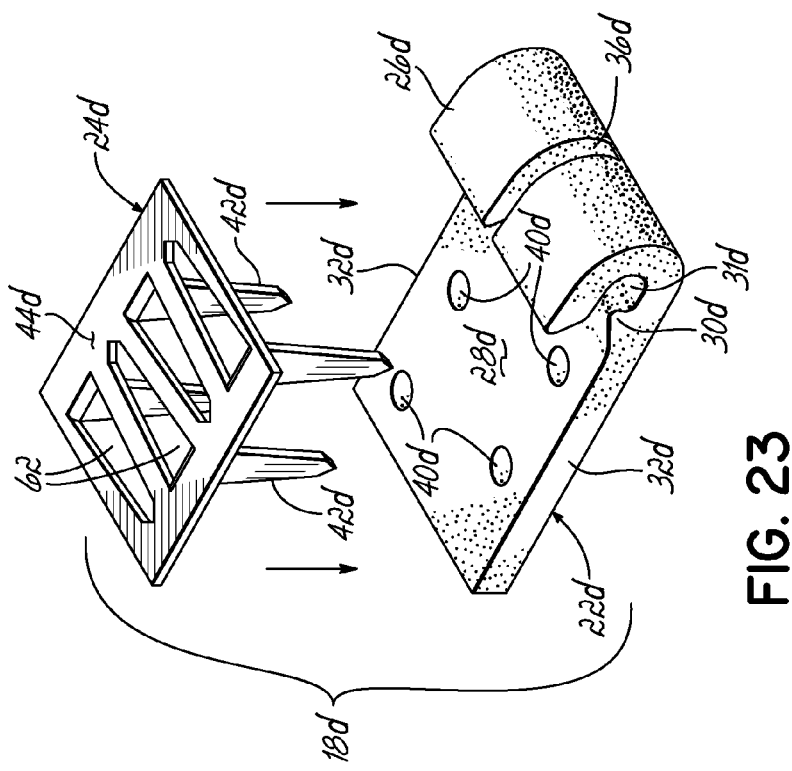
FIG. 23 is a partially disassembled view of a portion of the clip assembly of FIG. 18.

FIGS. 19 and 19A each show one of the clip assemblies 18d secured to one of the side walls 14b of frame 12b. As best shown in FIG. 23, each clip assembly 18d comprises a first non-metallic piece 22d, usually made of plastic, and a second metal piece 24d, respectively. The pieces 22d, 24d are joined together and secured to one of the side walls 14d of the generally rectangular furniture frame 12d.

Figure 25:
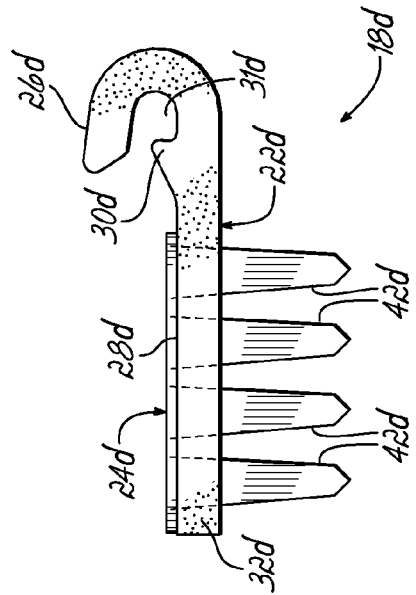
FIG. 25 is a side elevational view of the clip assembly of FIG. 23.

As shown in FIG. 23, the first piece 22d of clip assembly 18d comprises a U-shaped hook portion 26d adapted to receive and retain an end portion 21 of one of the sinuous springs 20. The first piece 22d of clip assembly 18d further comprises a generally planar body portion 28d, which includes a ledge 30d extending from one side edge 32d to the opposed side edge 32d of the body portion 28d of the first piece 22d of the clip assembly 18d. When the end portion 21 of one of the sinuous springs 20 is inserted into the U-shaped hook portion 26d, the ledge 30d of the body portion 28d holds or retains the end portion 21 of the sinuous spring 20 in a receptacle 31d, illustrated in FIG. 25. As best shown in FIG. 23, the U-shaped hook portion 26d of the first piece 22d of clip assembly 18d has a groove 36d extending inwardly from the outer surface of the U-shaped hook portion 26d, the groove 36d being adapted to receive a non-metallic connector 38. One connector 38 connects multiple clip assemblies 18d together, as shown in FIGS. 20-22.

As shown in FIG. 23, the body portion 28d of the first piece 22d of clip assembly 18d has four openings 40d, each opening 40d extending through the thickness of the body portion 28d of the first piece 22d of clip assembly 18d. As best shown in FIG. 23, the second piece 24d of clip assembly 18d has four tacks 42d extending downwardly from a generally planar, generally body portion 44d of the second piece 24d of clip assembly 18d. More particularly, each of the tacks 42d is formed from material from the body portion 44d of the second piece 24d of clip assembly 18d using a punch press. The tacks 24d initially lie in the plane of the body portion 44d and are bent downwardly out of the plane, thereby leaving four openings 62 in the body portion 44d of the second piece 24d of clip assembly 18d. The tacks 42d of the second piece 24d of clip assembly 18b are located and sized to pass through the openings 40d of the first piece 22d of clip assembly 18d. Each of the tacks 42d of the second piece 24d of clip assembly 12 are generally planar, lacking the crease and serrations of the tacks 42c of the second piece 24c of clip assembly 18c, shown in FIG. 15A. However, the tacks 42d of the second piece 24d of clip assembly 18d may have creases or serrations, as illustrated and described herein.

As best illustrated in FIGS. 18, 19 and 19A, the tacks 42d of the second piece 24d of clip assembly 18d are secured inside one of the side walls 14d of furniture frame 12d with a clipping tool (not shown). When secured in place, the body portion 28d of the first piece 22d of clip assembly 18d contacts or abuts an upper side surface 50 of one of the side walls 14d of furniture frame 12d. As best shown in FIGS. 19 and 19A, the U-shaped hook portion 26d of the first piece 22d of clip assembly 18d is located generally towards the interior of the rectangular frame 12d.

FIG. 20 shows four clip assemblies 18d aligned in a similar orientation and having the body portion 28d of the first piece 22d of a clip assembly 18d contacting or proximate the U-shaped hook portion 26d of the first piece 22d of an adjacent clip assembly 18d. When the clip assemblies 18d are juxtaposed in such a manner, the groove 36d of each clip assembly 18b is co-linearly aligned to permit a flexible connector 38 to be inserted into the aligned grooves 36d and extend the length of the aligned clip assemblies 18d. As best shown in FIGS. 20-22, the flexible connector 38 is trapped or sandwiched between the first and second pieces 22d, 24d of each clip assembly 18d, each flexible connector 38 being inside a plurality of aligned grooves 36d of multiple clip assemblies 18d.

Although FIGS. 20-22 show four clip assemblies 18d aligned in a string 56d of aligned collated clip assemblies 18d, the string 56d of aligned collated clip assemblies 18d may be made of any number of clip assemblies 18d connected together.

The connector 38 used to interconnect adjacent aligned clip assemblies 18d into a string 56d is preferably fabricated from a plastic material, such as a low density polyethylene or polyester plastic. The connector 38 provides a flexibility in the collated string 56d of clip assemblies 18d, which is needed when the string 56d is bent and rolled into a spool for insertion into a clipping tool. The connector 38 has the required tensile strength to withstand pulling and twisting forces without breaking. Also, when a last clip assembly is cut off from the string 56d, there are no sharp or jagged barbs left over to injure workers or tear fabric covering the clipped wires.

When used in a clipping tool, the connector 38 may be broken between adjacent clip assemblies 18d in the collated string 56d of clip assemblies 18d, leaving portions 58 of the connector 38 with the clip assembly 18d secured to the frame 12d. FIG. 19A illustrates one such clip assembly 18d, each clip assembly 18d having portions 58 of the connector 38 still with the clip assembly 18d when the clip assembly 18d is secured to one of the side walls 14d of frame 12d.

Figure 26:
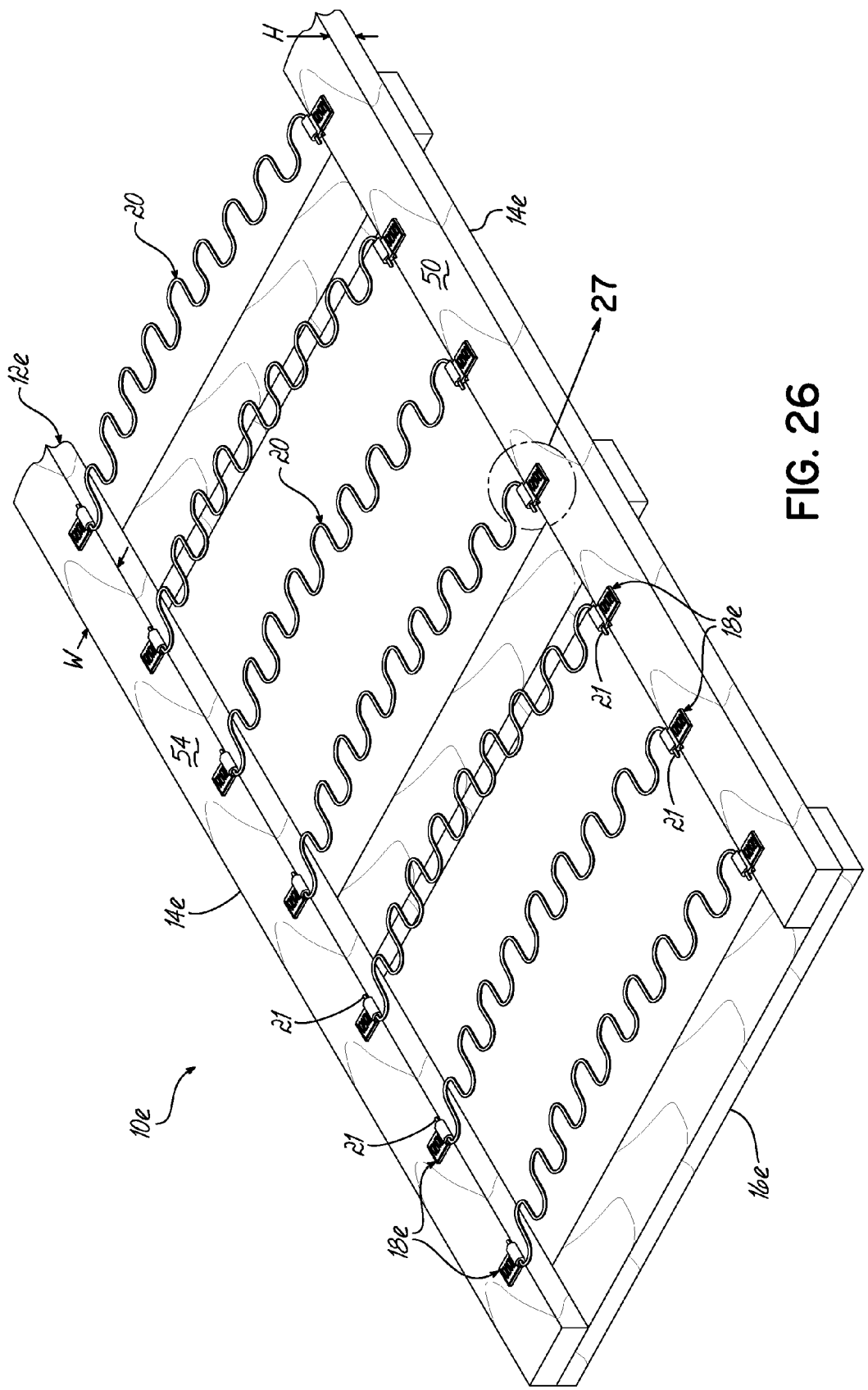
FIG. 26 is a perspective view of a furniture frame and sinuous springs extending from one side to the other side of the frame, clip assemblies in accordance with another embodiment being secured to the frame sides, similar to FIG. 18.

FIG. 26 illustrates a portion of a piece of furniture 10e comprising a rectangular frame 12e comprising two side walls 14e and two end walls 16e (only one being shown in FIG. 26). The frame 12e is most commonly made of wood, but may be made of other suitable materials. In the embodiment of frame 12e shown in FIG. 26, each of the side and end walls 14e, 16e, respectively, is oriented such that the width "W" of each wall 14e, 16e is greater than its height "H".

As shown in FIG. 26, furniture piece 10e further comprises a plurality of clip assemblies 18e secured to the side walls 14e of the frame 12e in a spaced manner for securing and retaining a plurality of sinuous springs 20. Clip assemblies 18e, secured to opposed side walls 14e, are aligned to receive and retain an end portion 21 of a sinuous spring 20 in a desired position and under a desired amount of tension, as shown in FIG. 26. Commonly, such sinuous springs 20 are arched or bowed upwardly to provide resiliency to the furniture piece 10e.

Figure 27A:
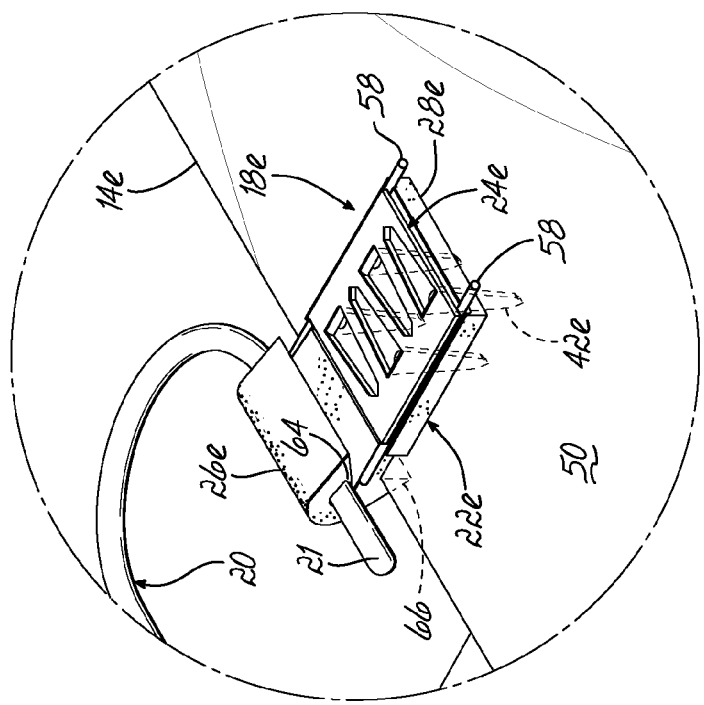
FIG. 27A is an enlarged view, similar to FIG. 27, of the clip assembly of FIG. 26 showing pieces of connectors secured to the clip assembly.
Figure 27:
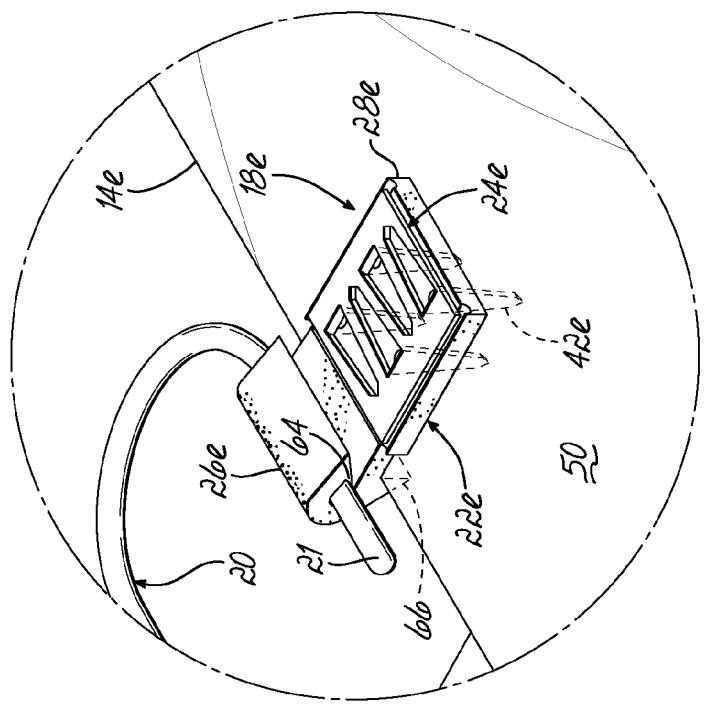
FIG. 27 is an enlarged view of the encircled area 27 of FIG. 26.
Figure 31:
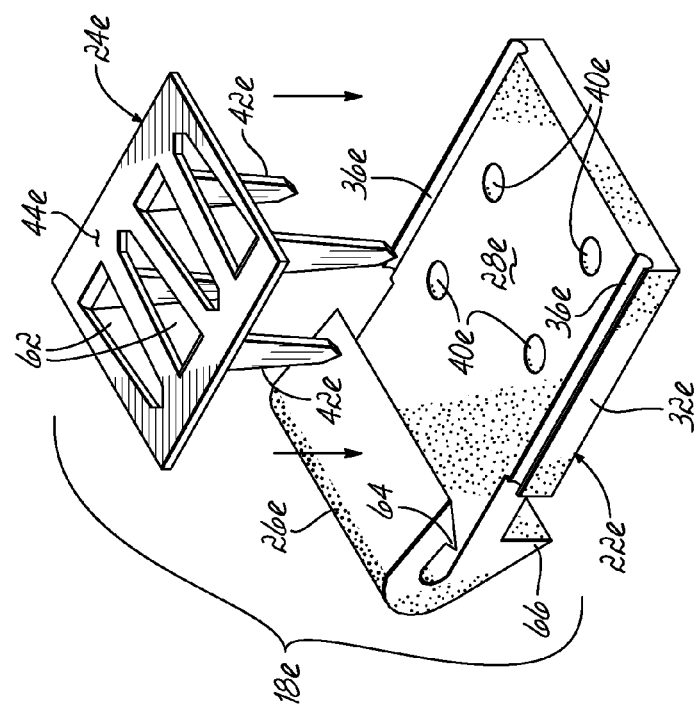
FIG. 31 is a partially disassembled view of a portion of the clip assembly of FIG. 28.

FIGS. 27 and 27A each show one of the clip assemblies 18e secured to one of the side walls 14e of frame 12e. As best shown in FIG. 31, each clip assembly 18e comprises a first non-metallic piece 22e, usually made of plastic, and a second metal piece 24e, respectively. The pieces 22e, 24e are joined together and secured to one of the side walls 14e of the generally rectangular furniture frame 12e.

Figure 29:
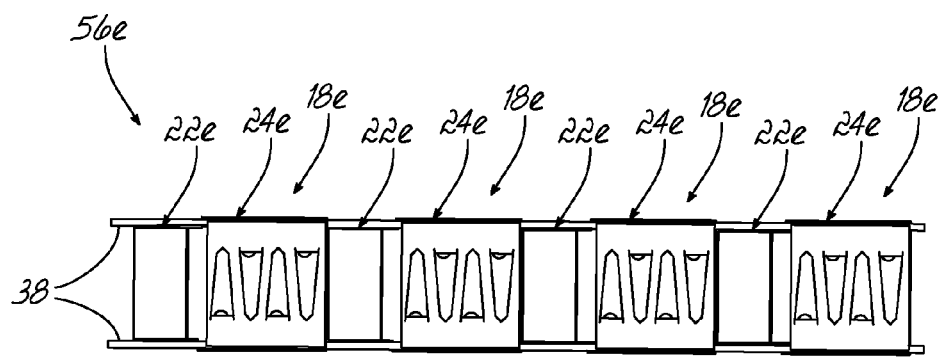
FIG. 29 is a top plan view of the portion of the collated string of clip assemblies of FIG. 28.
Figure 30:
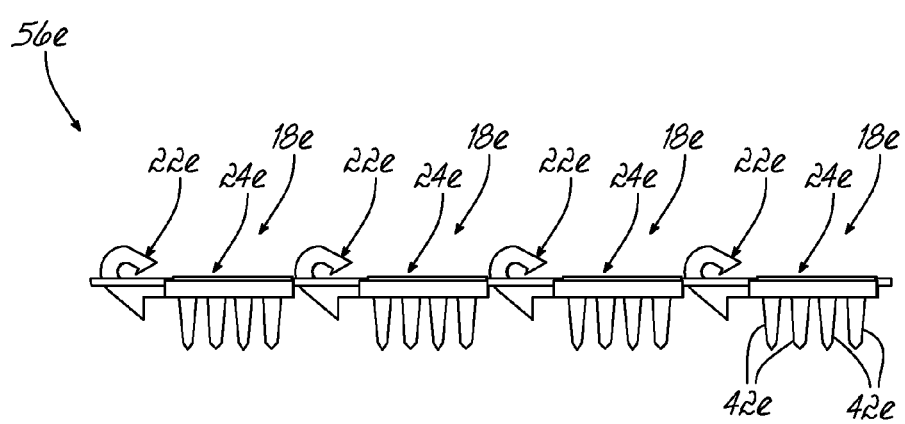
FIG. 30 is a side elevational view of the portion of the collated string of clip assemblies of FIG. 28.
Figure 32:
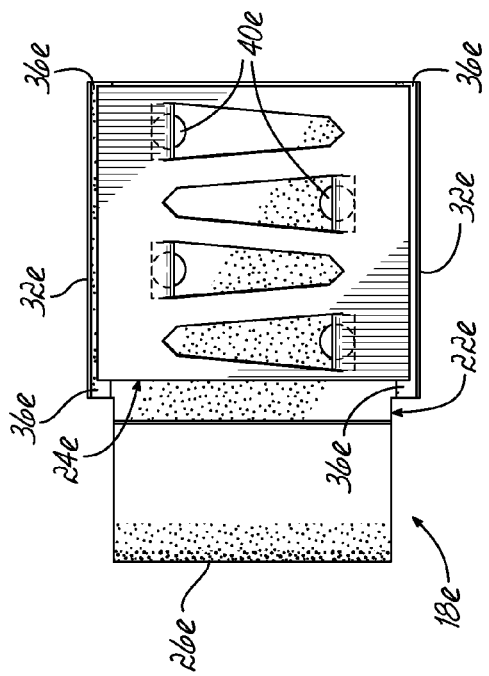
FIG. 32 is a top plan view of the clip assembly of FIG. 28.
Figure 33:
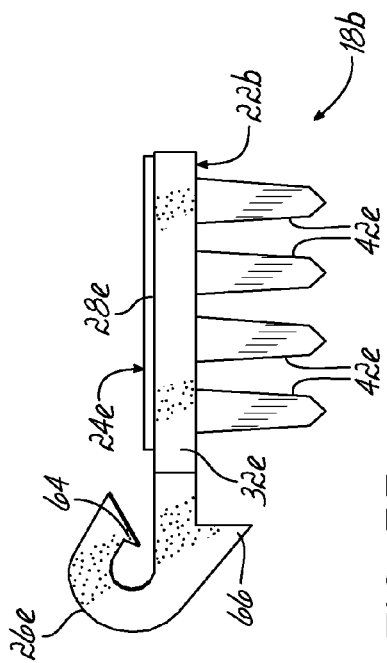
FIG. 33 is a side elevational view of the clip assembly of FIG. 28.

The first piece 22e of clip assembly 18e comprises a U-shaped hook portion 26e adapted to receive and retain an end portion 21 of one of the sinuous springs 20 having an end ledge 64. The first piece 22e of clip assembly 18e further comprises a generally planar body portion 28e, which includes a stop 66 extending from one side edge 32e to the opposed side edge 32e of the body portion 28e of the first piece 22e of the clip assembly 18e. When the end portion 21 of one of the sinuous springs 20 is inserted into the U-shaped hook portion 26e, the stop 66 of the body portion 28e abuts the frame 12e, as shown in FIG. 27. The U-shaped hook portion 26e holds or retains the end portion 21 of the sinuous spring 20 in a receptacle 31e, illustrated in FIG. 27. As best shown in FIG. 27A, the body portion 28e of the first piece 22e of clip assembly 18e has a pair of spaced grooves 36e along the outer periphery of the body portion 28e, each of the grooves 36e being adapted to receive a non-metallic connector 38. Two connectors 38 connect multiple clip assemblies 18e together, as shown in FIGS. 28-30.

As shown in FIG. 27, the body portion 28e of the first piece 22e of clip assembly 18e has four openings 40e, each opening 40e extending through the thickness of the body portion 28e of the first piece 22e of clip assembly 18e. As best shown in FIG. 27, the second piece 24e of clip assembly 18e has four tacks 42e extending downwardly from a generally planar, generally body portion 44e of the second piece 24e of clip assembly 18e. More particularly, each of the tacks 42e is formed from material from the body portion 44e of the second piece 24e of clip assembly 18e, using a punch press. The tacks 24e initially lie in the plane of the body portion 44e and are bent downwardly out of the plane, thereby leaving four openings 62 in the body portion 44e of the second piece 24e of clip assembly 18e. The tacks 42e of the second piece 24e of clip assembly 18e are located and sized to pass through the openings 40e of the first piece 22e of clip assembly 18e. Each of the tacks 42e of the second piece 24e of clip assembly 12 is generally planar, lacking the crease of the tacks 42c of the second piece 24c of clip assembly 18c shown in FIG. 15A. However, the tacks 42e of the second piece 24e of clip assembly 18e may have creases or serrations, as illustrated and described herein.

As best illustrated in FIGS. 26, 27 and 27A, the tacks 42e of the second piece 24e of clip assembly 18e are secured inside one of the side walls 14e of furniture frame 12e with a clipping tool (not shown). When secured in place, the body portion 28e of the first piece 22e of clip assembly 18e contacts or abuts an upper side surface 50 of one of the side walls 14e of furniture frame 12e. As best shown in FIGS. 27 and 27A, the U-shaped hook portion 26e of the first piece 22e of clip assembly 18e is located generally towards the interior of the rectangular frame 12e.

Figure 28:
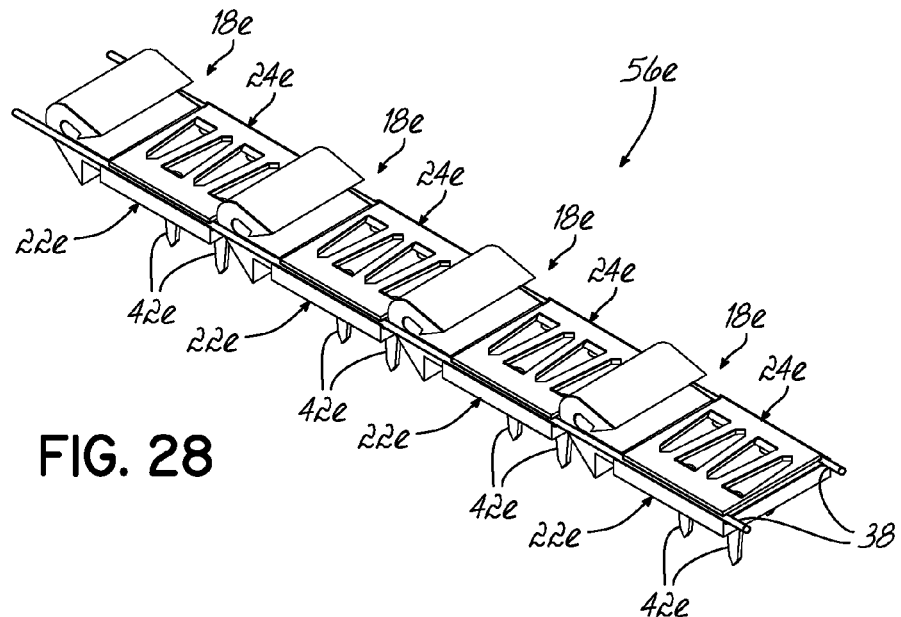
FIG. 28 is a perspective view of a portion of a collated string of clip assemblies of FIG. 26.

FIG. 28 shows four clip assemblies 18e aligned in a similar orientation and having the body portion 28e of the first piece 22e of a clip assembly 18e contacting or proximate the U-shaped hook portion 26e of the first piece 22e of an adjacent clip assembly 18e. When the clip assemblies 18e are juxtaposed in such a manner, the grooves 36e of each clip assembly 18e are co-linearly aligned to permit a flexible connector 38 to be inserted into each of the aligned grooves 36 and extend the length of the aligned clip assemblies 18e. As best shown in FIGS. 28-30, the two flexible connectors 38 are trapped or sandwiched between the first and second pieces 22e, 24e of each clip assembly 18e, each flexible connector 38 being inside a plurality of aligned grooves 36e of multiple clip assemblies 18e.

Although FIGS. 28-30 show four clip assemblies 18e aligned in a string 56e of aligned collated clip assemblies 18e, the string 56e of aligned collated clip assemblies 18e may be made of any number of clip assemblies 18e connected together.

The connectors 38 used to interconnect adjacent aligned clip assemblies 18e into a string 56e are preferably fabricated from a plastic material, such as a low density polyethylene or polyester plastic. The connectors 38 provide a flexibility in the collated string 56e of clip assemblies 18e, which is needed when the string 56e is bent and rolled into a spool for insertion into a clipping tool. The connectors 38 have the required tensile strength to withstand pulling and twisting forces without breaking. Also, when a last clip assembly is cut off from the string 56e, there are no sharp or jagged barbs left over to injure workers or tear fabric covering the clipped wires.

When used in a clipping tool, the connectors 38 may be broken between adjacent clip assemblies 18e in the collated string 56e of clip assemblies 18e, leaving portions 58 of the connectors 38 with the clip assembly 18e secured to the frame 12e. FIG. 27A illustrates one such clip assembly 18e, each clip assembly 18e having portions 58 of the connectors 38 still with the clip assembly 18e when the clip assembly 18e is secured to one of the side walls 14e of frame 12e.

Although the tacks are shown having a certain cross-sectional configuration, they may be other sizes or shapes. Similarly, the openings in the non-metallic pieces of the clip assemblies may be any desired shapes or sizes. Although we have described several embodiments of the invention, we do not intend to be limited except by the scope of the following claims. For example, the headboard may be omitted.

We claim:

1. A clip assembly for securing an end portion of a sinuous spring to a wooden rail, said clip assembly comprising:
   a plastic clip having a generally planar body portion and a U-shaped hook portion, the body portion having spaced grooves adapted to receive flexible connectors to join multiple clip assemblies together; and
   a metal fastener including multiple tacks extending downwardly from a generally planar portion of the fastener, wherein each of the tacks passes through a preexisting opening in the body portion of the plastic clip,
   portions of flexible connectors being inside the spaced grooves of the plastic clip and sandwiched between the plastic clip and the metal fastener of the clip assembly.

2. The clip assembly of claim 1 wherein the generally planar body portion of the plastic clip has a ledge extending from one side edge to the opposed side edge of the body portion.

3. The clip assembly of claim 1 wherein the metal fastener is a unitary member, the tacks of the metal fastener being formed from the material of the metal fastener.

4. The clip assembly of claim 1 wherein at least one of the tacks of the metal fastener is serrated.

5. The clip assembly of claim 1 wherein each of the tacks of the metal fastener is serrated.

6. The clip assembly of claim 1 wherein the flexible connectors are made of plastic.

7. The clip assembly of claim 1 wherein the metal fastener has four tacks.

8. The clip assembly of claim 1 wherein at least one of the tacks of the metal fastener is creased.

9. The clip assembly of claim 1 wherein each of the tacks of the metal fastener is creased.

10. The clip assembly of claim 1 wherein the spaced grooves are located adjacent side edges of the generally planar body portion of the plastic clip.

11. The clip assembly of claim 10 wherein the metal fastener has openings created by forming the tacks.

12. A clip assembly for securing an end portion of a sinuous spring to a wooden rail, said clip assembly comprising:
   a non-metallic clip having a generally planar body portion and a U-shaped hook portion, the body portion having spaced grooves adapted to receive flexible connectors to join multiple clip assemblies together; and
   a metal fastener including multiple tacks extending outwardly from a generally planar portion of the fastener wherein each of the tacks passes through a preexisting opening in the body portion of the non-metallic clip,
   portions of flexible connectors being inside the spaced grooves of the non-metallic clip and sandwiched between the non-metallic clip and the metal fastener of the clip assembly.

13. The clip assembly of claim 12 wherein the generally planar body portion of the non-metallic clip has a ledge extending from one side edge to the opposed side edge of the body portion.

14. The clip assembly of claim 12 wherein the metal fastener is a unitary member, the tacks of the metal fastener being formed from the material of the metal fastener and extending outwardly from the remainder of the metal fastener.

15. The clip assembly of claim 12 wherein at least one of the tacks of the metal fastener is serrated.

16. The clip assembly of claim 12 wherein each of the tacks of the metal fastener is serrated.

17. The clip assembly of claim 12 wherein the metal fastener has four tacks.

18. The clip assembly of claim 12 wherein at least one of the tacks of the metal fastener is creased.

19. A clip assembly for securing an end portion of a sinuous spring to a wooden rail, said clip assembly comprising:
   a non-metallic first piece having a generally planar body portion and a U-shaped hook portion, the body portion having a ledge extending from one side edge to the opposed side edge of the body portion and spaced grooves adapted to receive flexible connectors; and
   a metal second piece including projections extending outwardly from a generally planar portion of the second piece wherein each of the projections passes through the body portion of the first piece,
   portions of flexible connectors being inside the spaced grooves of the first piece and sandwiched between the first and second pieces of the clip assembly.

20. The clip assembly of claim 19 wherein the second piece is a unitary member, the projections of the metal fastener being formed from the material of the second piece and extending outwardly from the remainder of the second piece.

21. The clip assembly of claim 19 wherein at least one of the projections of the second piece is serrated.

22. The clip assembly of claim 19 wherein the second piece has four projections.

23. The clip assembly of claim 19 wherein at least one of the projections of the second piece is creased.

24. The clip assembly of claim 19 wherein each of the projections of the second piece is creased.

\* \* \* \* \*